(12) United States Patent
Norris et al.

(10) Patent No.: US 12,190,533 B2
(45) Date of Patent: Jan. 7, 2025

(54) FOCAL STACK CAMERA AS SECURE IMAGING DEVICE AND IMAGE MANIPULATION DETECTION METHOD

(71) Applicant: THE REGENTS OF THE UNIVERSITY OF MICHIGAN, Ann Arbor, MI (US)

(72) Inventors: Theodore Norris, Ann Arbor, MI (US); Zhengyu Huang, Ann Arbor, MI (US); Jeffrey Fessler, Ann Arbor, MI (US); Zhaohui Zhong, Ann Arbor, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 536 days.

(21) Appl. No.: 17/474,546

(22) Filed: Sep. 14, 2021

(65) Prior Publication Data
US 2022/0084223 A1    Mar. 17, 2022

Related U.S. Application Data

(60) Provisional application No. 63/078,038, filed on Sep. 14, 2020.

(51) Int. Cl.
*G06T 7/33* (2017.01)

(52) U.S. Cl.
CPC .... *G06T 7/337* (2017.01); *G06T 2207/20081* (2013.01); *G06T 2207/20084* (2013.01)

(58) Field of Classification Search
CPC ........... G06T 7/337; G06T 2207/20081; G06T 2207/20084; G06T 2201/0201; G06T 1/0028; G06V 10/147; G06V 10/82
See application file for complete search history.

(56) References Cited

U.S. PATENT DOCUMENTS

| | | | | | |
|---|---|---|---|---|---|
| 5,054,097 | A | * | 10/1991 | Flinois | G06T 3/153 348/181 |
| 2017/0237918 | A1 | * | 8/2017 | Norris | H01L 27/14627 348/46 |

(Continued)

OTHER PUBLICATIONS

Huh, Minyoung, et al. "Fighting fake news: Image splice detection via learned self-consistency." Proceedings of the European conference on computer vision (ECCV). 2018. https://openaccess.thecvf.com/content_ECCV_2018/papers/Jacob_Huh_Fighting_Fake_News_ECCV_2018_paper.pdf (Year: 2018).*

(Continued)

*Primary Examiner* — Matthew C Bella
*Assistant Examiner* — Andrew B. Jones
(74) *Attorney, Agent, or Firm* — Harness, Dickey & Pierce, P.L.C.

(57) ABSTRACT

Image security is becoming an increasingly important issue with the progress of deep learning based image manipulations, such as deep image inpainting and deep fakes. There has been considerable work to date on detecting such image manipulations using better and better algorithms, with little attention being paid to the possible role hardware advances may have for more powerful algorithms. This disclosure proposes to use a focal stack camera as a novel secure imaging device for localizing inpainted regions in manipulated images. Applying convolutional neural network (CNN) methods to focal stack images achieves significantly better detection accuracy compared to single image based detection.

7 Claims, 17 Drawing Sheets

(56) References Cited

U.S. PATENT DOCUMENTS

2018/0373958 A1* 12/2018 Patel ................. G06T 7/174
2020/0099955 A1*  3/2020 Guillotel ............. H04N 19/162

OTHER PUBLICATIONS

Jacobs, David E., Jongmin Baek, and Marc Levoy. "Focal stack compositing for depth of field control." Stanford Computer Graphics Laboratory Technical Report 1.1 (2012): 2012. https://graphics.stanford.edu/papers/focalstack/focalstack.pdf (Year: 2012).*

Ng, Ren, et al. Light field photography with a hand-held plenoptic camera. Diss. Stanford university, 2005. https://hal.science/hal-02551481/ (Year: 2005).*

Cozzolino, Davide et al., "Image Forgery Localization Through The Fusion Of Camera-Based, Feature-Based And Pixel-Based Techniques", IEEE International Conference on Image Processing (ICIP), Oct. 2014.

Wu, Yue et al., "BusterNet: Detecting Copy-Move Image Forgery With Source/Target Localization", European Conference on Computer Vision (ECCV), 2018.

Li, Haodong et al., "Localization of Deep Inpainting Using High-Pass Fully Convolutional Network", IEEE/CVF International Conference on Computer Vision (ICCV), 2019.

Dadkhah, Sajjad et al., "An effective SVD-based image tampering detection and self-recovery using active watermarking", Signal Processing: Image Communication, 2014.

Wang, Sheng-Yu et al., "CNN-generated images are suprisingly easy to spot . . . for now", arXiv:1912.11035v2 [cs.CV], Apr. 4, 2020.

* cited by examiner

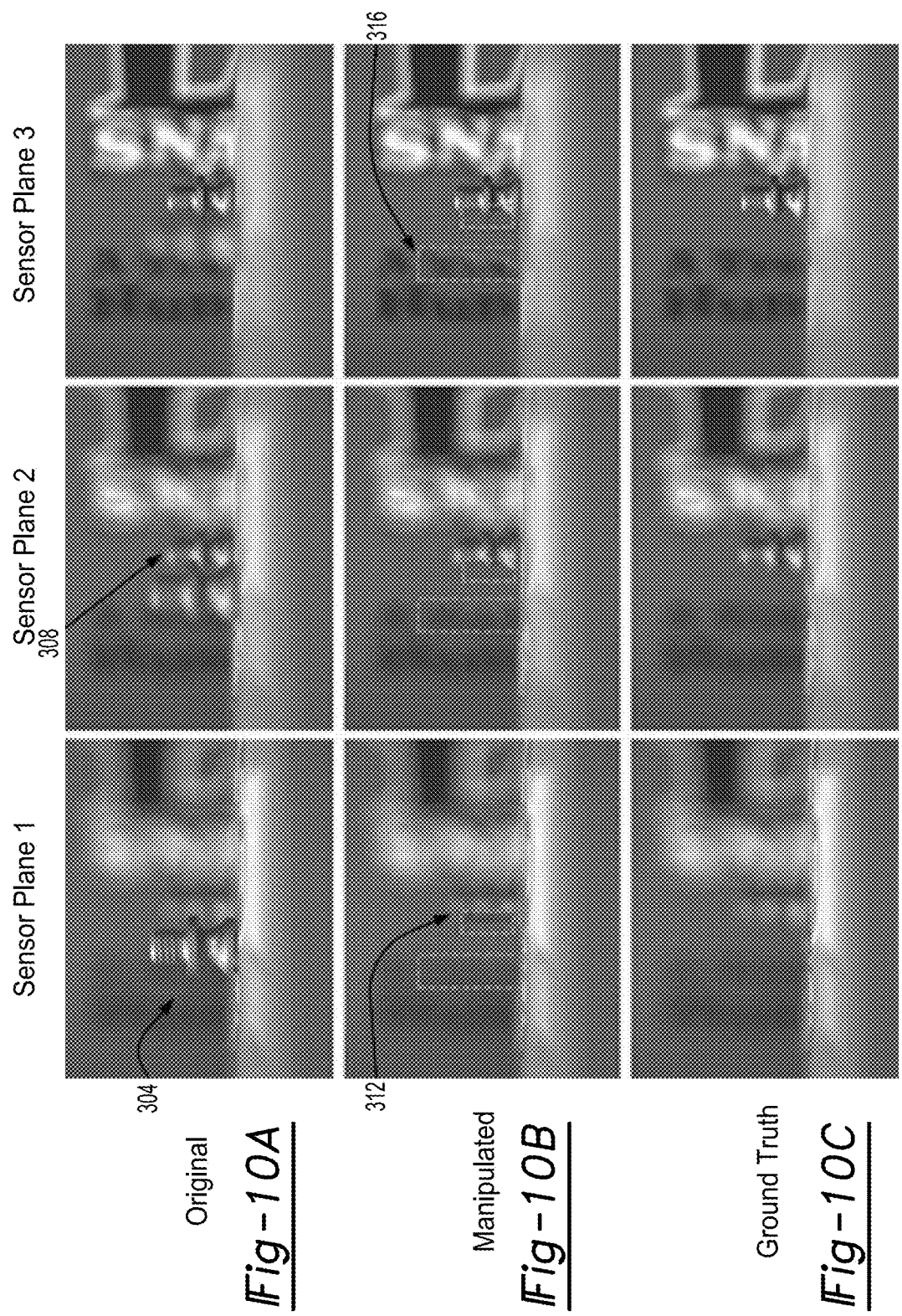

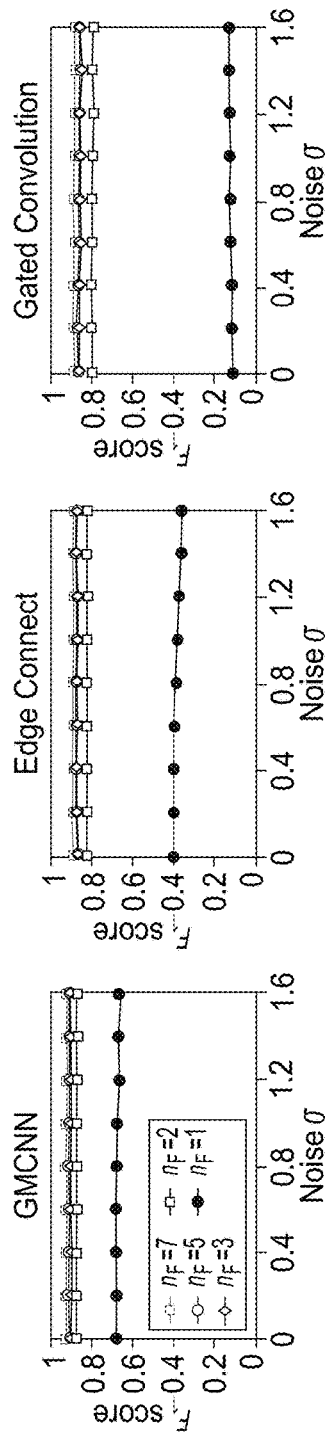
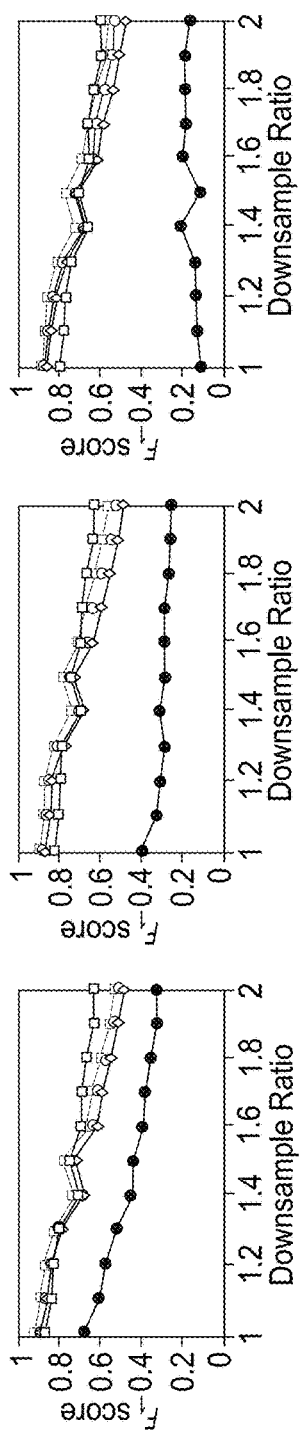
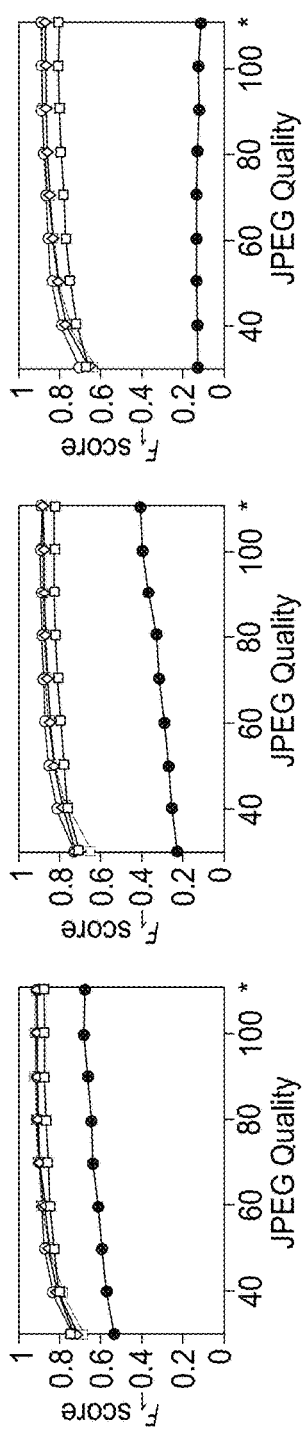
Fig-12A Fig-12B Fig-12C
Fig-12D Fig-12E Fig-12F
Fig-12G Fig-12H Fig-12I

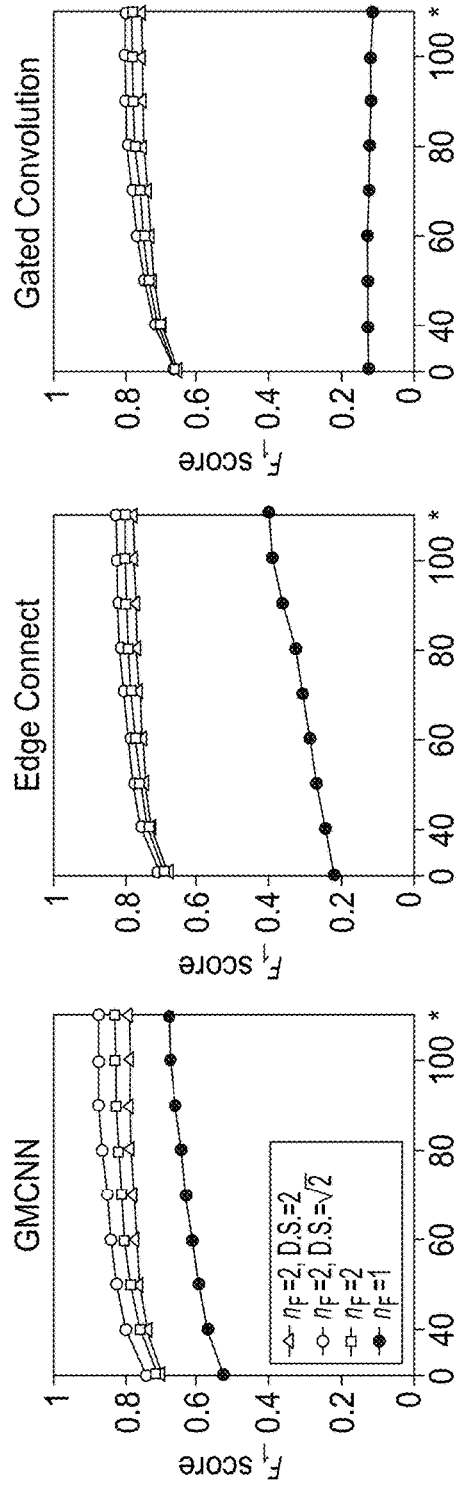
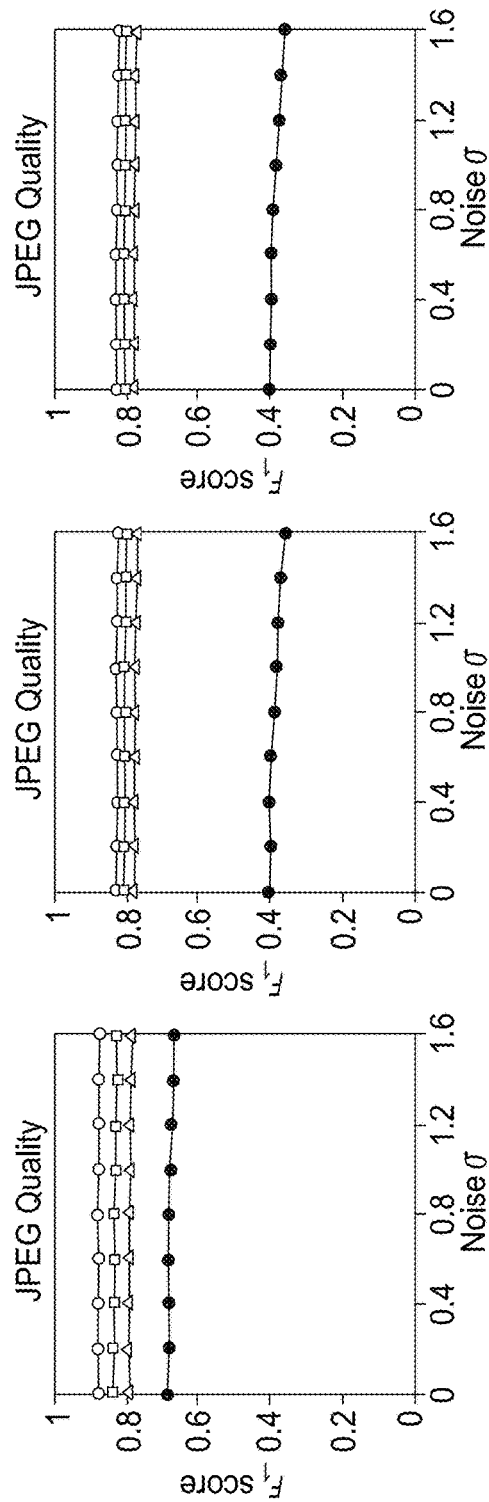
Fig-16A Fig-16B Fig-16C Fig-16D Fig-16E Fig-16F

FOCAL STACK CAMERA AS SECURE IMAGING DEVICE AND IMAGE MANIPULATION DETECTION METHOD

CROSS-REFERENCE TO RELATED APPLICATIONS

This application claims the benefit of U.S. Provisional Application No. 63/078,038, filed on Sep. 14, 2020. The entire disclosure of the above application is incorporated herein by reference.

FIELD

The present disclosure relates to secure imaging and more particularly to detecting manipulation of secure images.

BACKGROUND

Digital images are convenient to store and share, but they are also susceptible to malicious manipulation. With the advancement of deep learning, manipulated images and videos can be produced with high fidelity. Possible manipulations include splicing (inserting new object into the content), copy-move, object removal, etc. Faked images could result in fake-news, political propaganda, and financial hoaxes, posing a great threat to the society.

In media forensics, many possible signatures in the image can be used to detect fake images and videos, which can be categorized into either passive or active approach. In the active approach, semi-fragile watermarks are pro-actively embedded into the image. The introduced watermark (visually imperceptible) is persistent after benign image operations such as brightness adjustment, resizing, and compression but gets destroyed after malicious editing. In the passive approach, imaging artifacts due to lens distortion, color filtering, Photo Response Non-Uniformity (PRNU), and compression can be used to authenticate an image.

Both methods have their own limitations. The passive approach, while being simple to implement, relies on weak traces that are likely to be destroyed after compression/resizing. PRNU fingerprint analysis, while being a popular forensic method, requires knowledge about the source camera's PRNU. On the other hand, the active watermarking approach is more robust against compression/resizing but alters the original content inevitably due to the watermark embedding.

This section provides background information related to the present disclosure which is not necessarily prior art.

SUMMARY

This section provides a general summary of the disclosure, and is not a comprehensive disclosure of its full scope or all of its features.

An image manipulation detection method is presented. The method includes: receiving a stack of images for a given scene, where each image in the stack of images is captured at a different focal plane by an imaging device and one of the images in the stack of images is designated as an image of interest; and determining whether images in the stack of images are self-consistent across the stack of images. When the images are self-consistent across the stack of images, the image of interest is tagged as authentic. When the images are not self-consistent across the stack of images, the image of interest is tagged as being manipulated. In either case, the image along with its tag may be stored in a non-transitory data store for subsequent processing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 10A-10C depict an example blur inconsistency of a set of images.

FIGS. 12A-12I show localization F1 scores for focal stack data with networks trained on GMCNN dataset with JPEG augmentation and tested on GMCNN data (FIGS. 12A, 12D, 12G), EdgeConnect data (FIGS. 12B, 12E, 12H) and Gated Convolution data (FIGS. 12C, 12F, 12I). The robustness against Gaussian noise, resizing and JPEG compression are shown for each model.

FIGS. 16A-16I show localization F1 scores for focal stack data with networks trained on GMCNN dataset with JPEG augmentation and tested on GMCNN data (FIGS. 16A, 16D, 16G), EdgeConnect data (FIGS. 16B, 16E, 16H) and Gated Convolution data (FIGS. 16C, 16F, 16I), showing the total pixel dependence. The robustness against Gaussian noise, resizing and JPEG compression are shown for each model.

Corresponding reference numerals indicate corresponding parts throughout the several views of the drawings.

DETAILED DESCRIPTION

Example embodiments will now be described more fully with reference to the accompanying drawings.

Figure 1:
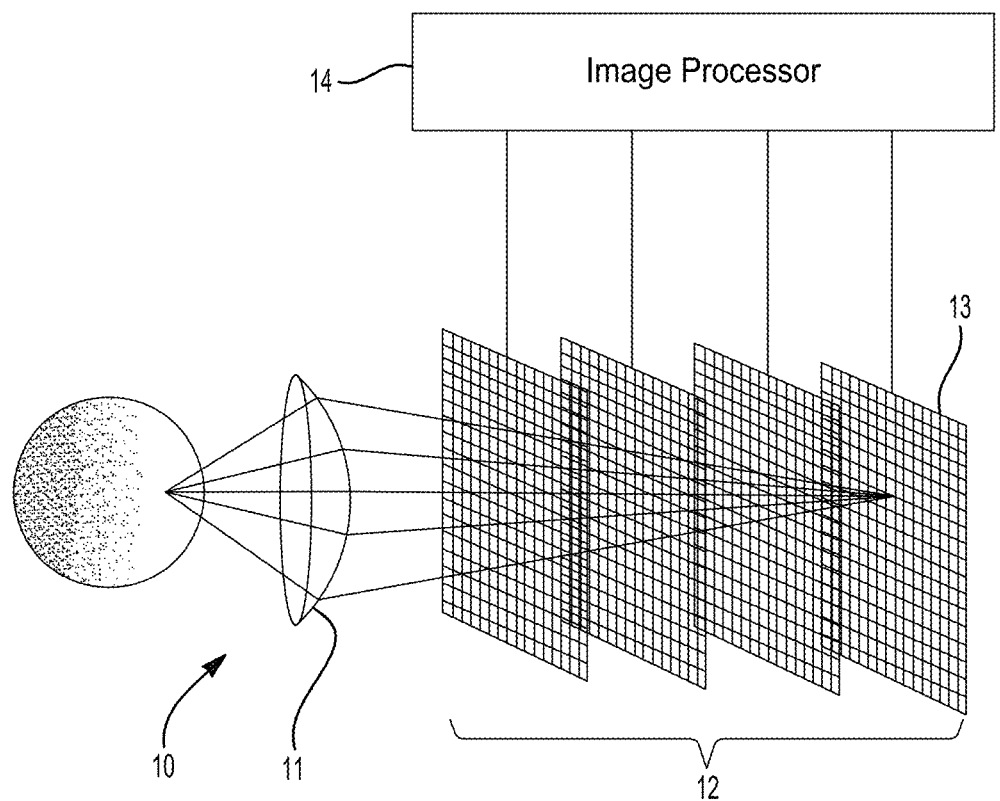
FIG. 1 is a diagram of a focal stack optical imaging system.

FIG. 1 depicts an example optical imaging system 10. The optical imaging system 10 is configured to generate stacked images of a scene to create a 3D representation of the scene. The optical imaging system 10 is comprised of an imaging optic 11, a stack of two of more detector planes 12, and an image processor 14. Each of the detector planes is arranged in a different geometric plane and the geometric planes are parallel with each other. The detector planes 12 are transparent although the final detector plane 13 may be opaque in some embodiments. It is envisioned that other optical components (e.g., a coded aperture) may be needed to implement the overall operation of the optical imaging system 10.

The imaging optic 11 is configured to receive light rays from a scene and refract the light rays towards the stack of detector planes 12, such that the refracted light rays pass through the detector planes 12. The refracted light rays are focused within the stack of detector planes 12. In one embodiment, the imaging optic 11 focuses the refracted light rays onto one of the detector planes. In other embodiments, the imaging optic 11 may focus the refracted light rays in between two of the detector planes 12. In the example embodiment, the imaging optic 11 is implemented by an objective lens and the light is focused onto the final detector plane 13. Other types of imaging optics are contemplated including but not limited to camera lens, metalens, microscope lens and zoom lens.

The detector planes 13 include one or more transparent photodetectors. In an example embodiment, the transparent photodetectors include a light absorbing layer and a substrate, where the light absorbing layer is comprised of a two-dimensional material and the substrate is comprised of a transparent material. As a result, the transparent photodetectors have transparency greater than fifty percent (and preferably >85%) while simultaneously exhibiting responsivity greater than one amp per watt (and preferably >100 amps per watt). Example constructs for transparent photodetectors are further described below. Examples of other suitable photodetectors are described by Seunghyun Lee, Kyunghoon Lee, Chang-Hua Liu and Zhaohui Zhong in "Homogeneous bilayer graphene film based flexible transparent conductor" Nanoscale 4, 639 (2012); by Seunghyun Lee, Kyunghoon Lee, Chang-Hua Liu, Girish S. Kulkarni and Zhaohui Zhong, "Flexible and transparent all-graphene circuits for quaternary digital modulations" Nature Communications 3, 1018 (2012); and by Chang-Hua Liu, You-Chia Chang, Theodore B. Norris and Zhaohui Zhong, "Graphene photodetectors with ultra-broadband and high responsivity at room temperature" Nature Nanotechnology 9, 273-278 (2014). Each of these article are incorporated in their entirety herein by reference.

In the example embodiment, each detector plane 12 includes an array of photodetectors. In some embodiments, each photodetector in a given array of photodetectors aligns with a corresponding photodetector in each of the other arrays of photodetectors. In other embodiments, photodetectors across different arrays do not necessarily align with each other. In any case, the optical imaging system records information related to the direction of propagation because rays are incident upon photodetectors across the stack of detector planes.

In operation, a bundle of light rays emitted from an object point are collected by the imaging optic 11. The imaging optic 11 refracts the light rays towards the stack of detector planes 12, such that the refracted light rays pass through at least one of the detector planes and are focused at some point within the stack of detector planes. Some of the light is absorbed by photodetectors in each of the intermediate detector planes. The sensors must absorb some of the light to obtain the intensity distribution in each (x,y) plane, but pass sufficient light that several detector planes can be positioned in front of the final detector plane 13.

The image processor 14 is in data communication with each of the photodetectors in the stack of two or more photodetectors and is configured to receive light intensity measured by each of the photodetectors. The image processor 14 in turn reconstructs a light field for the scene using the light intensity measured by each of the photodetectors. An example method for reconstructing the light field is further described below. The image processor 14 may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Figure 2A:
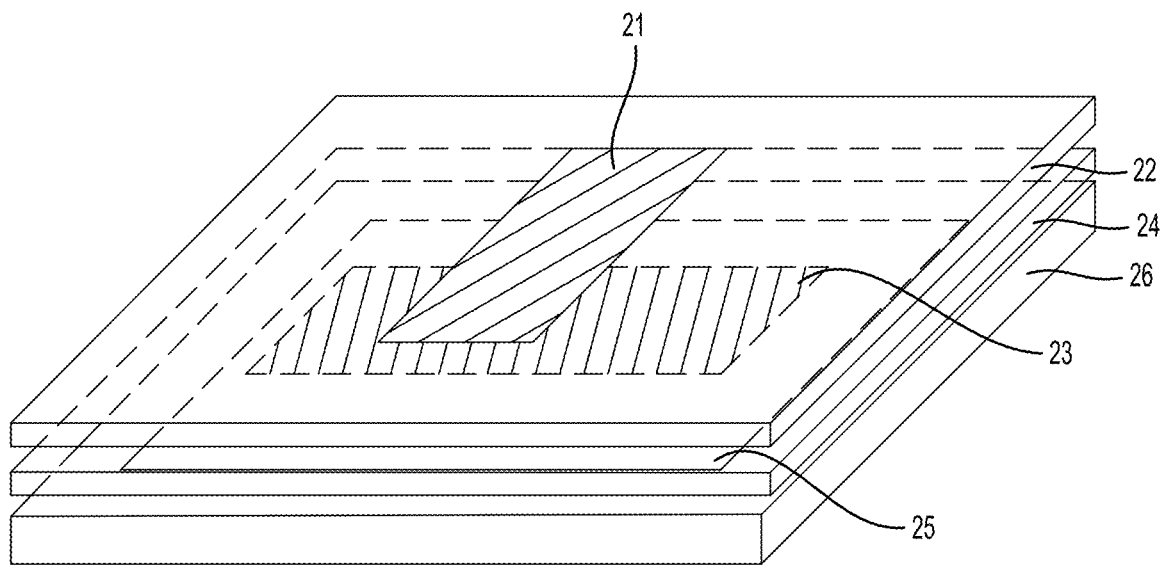
FIGS. 2A and 2B are a perspective view and a cross-sectional side view of an example embodiment of a transparent heterojunction photodetector, respectively.
Figure 2B:
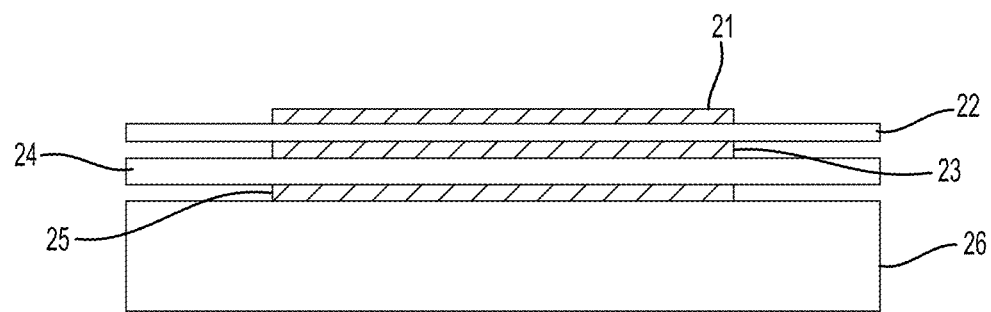

FIGS. 2A and 2B depict an example embodiment of a transparent heterojunction photodetector 20 suitable for use in the optical imaging system 10. The photodetector 20 is comprised generally of a light absorbing layer 21 disposed on a bottom-gated field effect transistor and supported by a transparent substrate 26. In the example embodiment, graphene forms the light absorbing layer 21, the channel layer 23 of the FET and the bottom gate layer 25. The graphene may be grown by chemical vapor deposition on copper foil and then transferred onto the substrate using conventional layer transfer processes, and patterned using conventional photolithography processes. The light absorbing layer 21 is separated from the channel layer 23 by a tunnel barrier layer 22. In the example embodiment, the tunnel barrier 22 is formed by a thin layer (e.g., 6 nm) of tantalum pentoxide deposited for example by RF sputtering. The channel layer 23 is separated from the bottom gate layer 25 by another barrier layer 24. In the example embodiment, the second barrier layer 24 is a dielectric material, such as aluminum oxide (e.g., 40 nm) deposited, for example with an atomic layer deposition technique. Different dielectrics are preferably deposited between the graphene layers in order to make the high performance bottom-gated FET with double layer graphene heterojunction utilize the photo-gating effect for high responsivity photo detection. Further details regarding the working principle for the heterojunction photodetector may be found in U.S. Patent Publication No. 2004/0264275 which is incorporated in its entirety by reference.

Figure 2C:
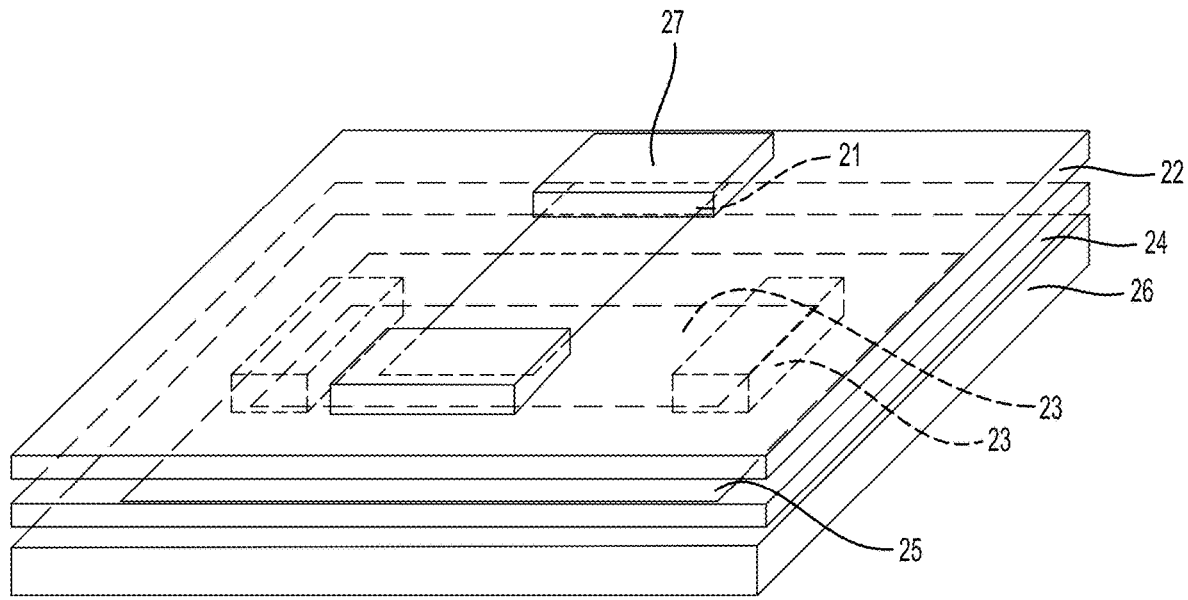
FIGS. 2C and 2D are a perspective view and a cross-sectional side view of a second example embodiment of a transparent heterojunction photodetector, respectively.
Figure 2D:
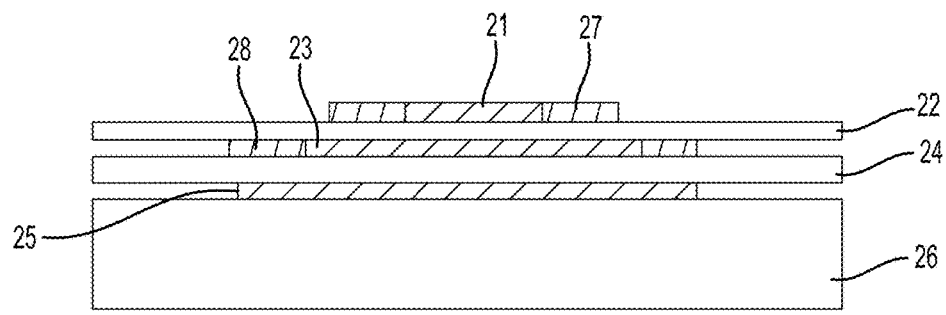

FIGS. 2C and 2D depict a second example embodiment of a transparent heterojunction photodetector 20' which includes metal contacts. Likewise, the photodetector 20' is comprised generally of a light absorbing layer 21 disposed on a bottom-gated field effect transistor and supported by a transparent substrate 26. In this case, metal contacts 27 are formed on longitudinal ends of the light absorbing layer 21 as well as metal contacts 28 are formed on longitudinal ends of the channel layer 23. In the example embodiment, the metal contacts are formed by gold using a metal lift-off process. Except with respect to the differences discussed herein, the photodetector 20' may be substantially the same as the photodetector 20 described above. While the exemplary embodiments of the photodetectors have been described above with specific materials having specific values and arranged in a specific configuration, it will be appreciated that these photodetectors may be constructed with many different materials, configurations, and/or values as necessary or desired for a particular application. For example, graphene may be replaced with different two-dimensional materials including but not limited to hexagonal boron nitride, molybdenum disulphide and other transition metal dichalcogenides. The above configurations, materials and values are presented only to describe one particular embodiment that has proven effective and should be viewed as illustrating, rather than limiting, the present disclosure.

Figure 3:
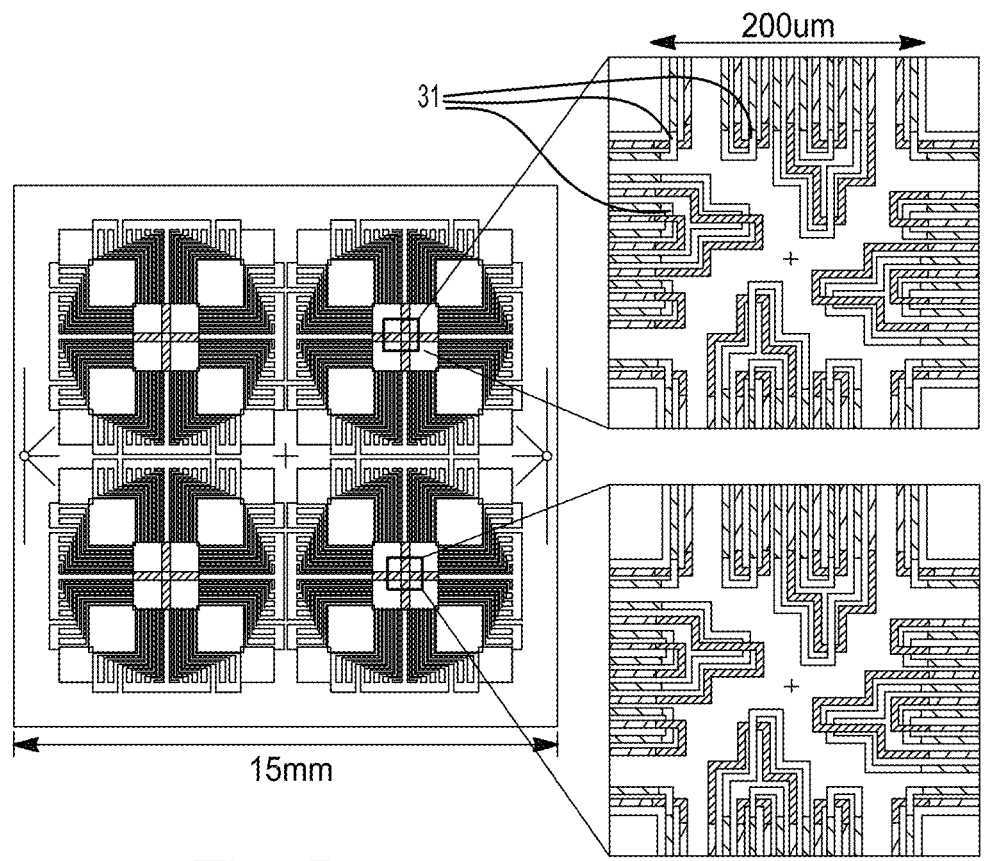
FIG. 3 is a diagram of a detector plane showing the interconnections between photodetectors.

To form a detector plane, the photodetectors are arranged in an array on a transparent substrate. FIG. 3 illustrates how individual photodetectors can be interconnected. The enlarged area to the right and on top depicts a 4×4 array of photodetectors, where a single pixel is formed at each crossing indicated at 31. Similarly, the enlarged area to the right and on the bottom depicts a 4×4 array of photodetectors, where a single pixel is formed at each crossing. On the top, metal contacts are shown along the edges of the array; whereas, on the bottom, the contacts are formed from graphene and thus form an entirely transparent array of photodetectors.

Figure 4:
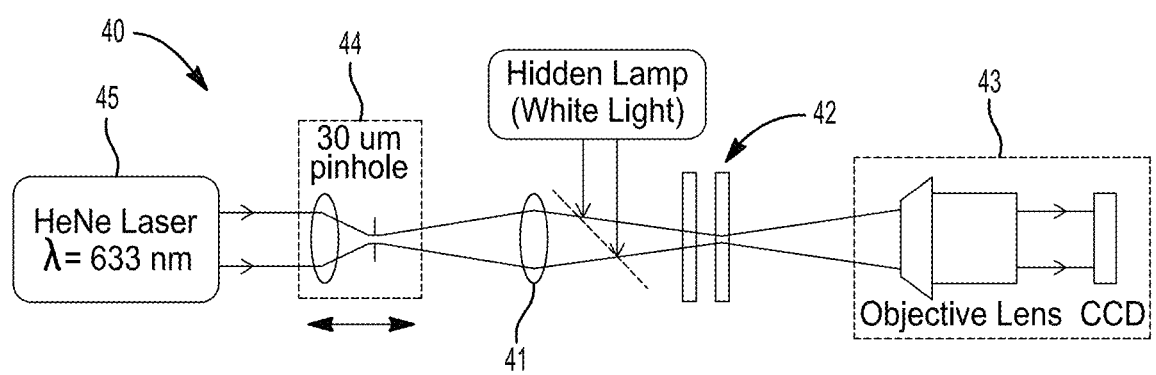
FIG. 4 is a diagram of an experimental scheme for demonstrating the optical imaging system.

FIG. 4 illustrates an experimental scheme for demonstrating the optical imaging system 40. For this demonstration, the optical imaging system 40 includes a 50 mm focal length front imaging lens 41 and two transparent graphene detectors 42 that are 2 mm apart. Behind the focal stack, a microscope 43 provides separate confirmation that the test object is perfectly imaged at the center of each graphene detector pixel. The test object is a point source 44 formed by illuminating a 200 μm pinhole with the focused 632 nm HeNe laser 45. The point source 44, the center of the imaging lens 41, the two single-pixel detectors 42, and the optical axis of the microscope 43 are well aligned on the same optical axis (referred to as the z axis).

When the point source is very far from the imaging lens, the real image is completely out of focus on both of the front and the back graphene detector sheets. The point source is then moved towards the imaging lens with a linear stage. At some point, the real image of the point source will be perfectly focused on the front detector sheet while staying out of focus on the back detector sheet.

Figure 5:
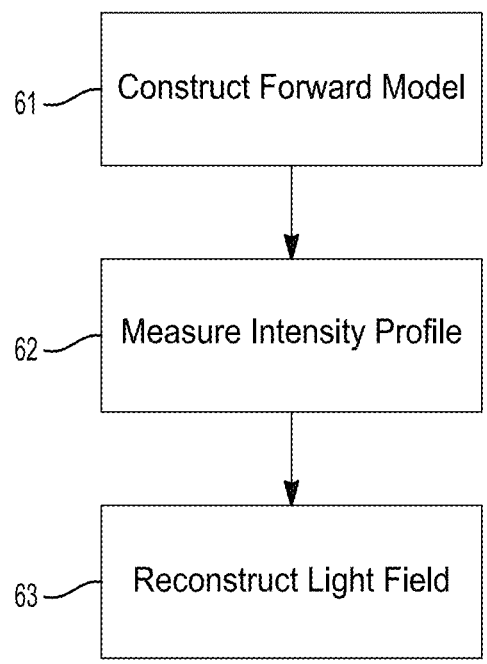
FIG. 5 is a flowchart depicting a method for reconstructing a light field from data recorded by the optical imaging system.

Next, a method is presented for reconstructing a light field from data recorded by the optical imaging system 10. Referring to FIG. 5, a forward model of the optical imaging system is first constructed at 61. More specifically, the forward model describes the intensity profile measured in each plane of the focal stack in terms of the light field propagating through the system. In an example embodiment, the forward model includes a transformation matrix that relates a light field for any given scene to light intensity of rays from the scene as would be measured by a stack of detector planes in the optical imaging system 10. The measurement model may also consider additive noise or other noise models. To determine the transformation matrix, one can either use an experimental approach where the intensity profile for a known object or groups of objects (typically a point source) is measured by the optical imaging system 10, or one can compute the transformation matrix based on a mathematical model using ray tracing or more accurate optical transforms. The matrix may be stored explicitly as an array of numbers, or represented equivalently by computational functions that perform the operations of matrix-vector multiplication and the transpose thereof.

The reconstruction process then corresponds to an inversion of the forward model to determine the lightfield of an unknown object or scene. That is, light intensity profile for an unknown scene is measured at 62 by the optical imaging system 10. The light field for the unknown scene can be reconstructed at 63 using the measured light intensity profile and the forward model. In an example embodiment, the reconstruction is cast in the form of a least-squares minimization problem. The key subtlety in the solution is that there is a dimensionality gap: the light field is a 4D entity, while the focal stack array produces 3D of data. The proposed method accounts for this dimensionality gap as explained below.

Figure 6:
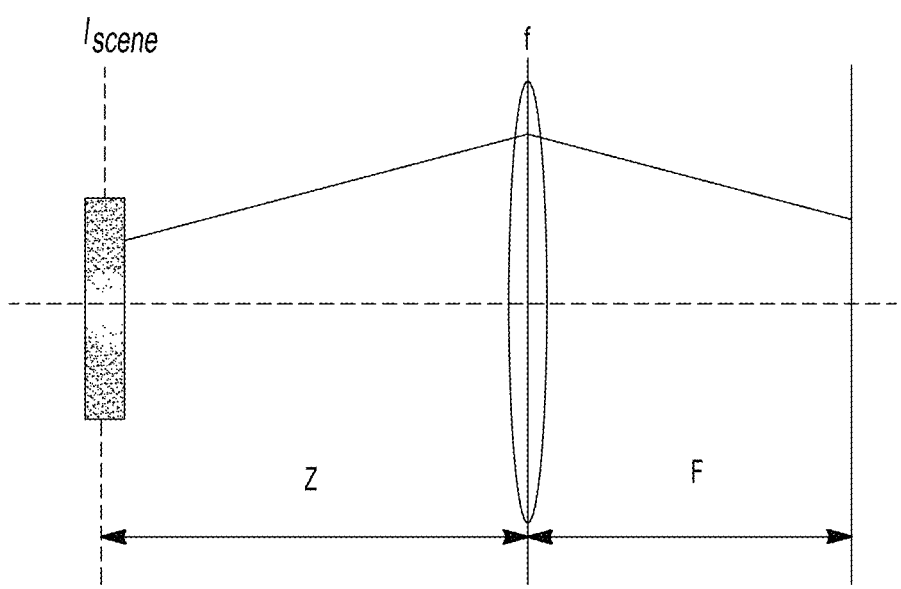
FIG. 6 is a diagram of a two-dimensional light field space.

For simplicity, an analysis is presented in a 2D space (2D lightfield). Consider a linear scene corresponding to a 1D object, with a reflectance pattern $$\ell_{scene}\left(\begin{bmatrix} x \\ u \end{bmatrix}\right)$$

using plane-plane parameterization. The lightfield first travels a distance of z to a lens with focal length f and is then imaged onto a 1D sensor that is distance F behind the lens as seen in FIG. 6. It is straightforward to extend the result to 3D space (4D lightfield).

Next, consider the forward model. Under the paraxial approximation, the effect of lightfield propagation and imaging lens refraction can both be modeled in the form of $$\ell'\left(\begin{bmatrix} x \\ u \end{bmatrix}\right) = \ell\left(A\begin{bmatrix} x \\ u \end{bmatrix}\right),$$

where A is the 2×2 optical transfer matrix. By the serial application of optical transfer matrices, the lightfield on the sensor is:

$$\ell_{sensor}\left(\begin{bmatrix} x \\ u \end{bmatrix}\right) = \ell_{scene}\left(C_{zfF}\begin{bmatrix} x \\ u \end{bmatrix}\right),$$

$$\text{where } C_{zfF} = \begin{bmatrix} 1-\frac{z}{f} & zF\left(\frac{1}{f}-\frac{1}{z}-\frac{1}{F}\right) \\ \frac{1}{f} & 1-\frac{F}{f} \end{bmatrix}$$

A camera coordinate re-parameterization is performed, making the x-axis be on the sensor (spatial axis) and the u-axis be on the lens (angular axis). The resulting lightfield in the camera now becomes $$\ell_{sensor}^{cam}\left(\begin{bmatrix} x \\ u \end{bmatrix}\right) = \ell_{scene}\left(H\begin{bmatrix} x \\ u \end{bmatrix}\right), \text{ where}$$

$$H = \begin{bmatrix} -\frac{z}{f} & 1 - \frac{z}{f} - \frac{z}{F} \\ \frac{1}{F} & \frac{1}{f} - \frac{1}{F} \end{bmatrix}$$

The formulation can be directly generalized to the 3D space (4D lightfield) with planar scene object (2D):

$$\ell_{sensor}^{cam}\left(\begin{bmatrix} x \\ u \end{bmatrix}, \begin{bmatrix} y \\ v \end{bmatrix}\right) = \ell_{scene}\left(H\begin{bmatrix} x \\ u \end{bmatrix}, H\begin{bmatrix} y \\ v \end{bmatrix}\right),$$

where H is defined as above and this can be rewritten in the form of simpler notations:

$$\ell_{sensor}^{cam}\left(\begin{bmatrix} \mathbf{x} \\ \mathbf{u} \end{bmatrix}\right) = \ell_{scene}\left(H\begin{bmatrix} \mathbf{x} \\ \mathbf{u} \end{bmatrix}\right)$$

where the bold characters $$\mathbf{x} = \begin{bmatrix} x \\ y \end{bmatrix} \text{ and } \mathbf{u} = \begin{bmatrix} u \\ v \end{bmatrix}$$

represent the 2D spatial and angular vector, respectively.

The image formation $i(\mathbf{x})$ is the integration of $\ell_{sensor}^{cam}(\mathbf{x}, \mathbf{u})$ over the aperture plane:

$$i(\mathbf{x}) = \int \ell_{sensor}^{cam}(\mathbf{x}, \mathbf{u}) d\mathbf{u}$$

To track the computation, the lightfield is discretized as $$\ell_{sensor}^{cam}(\mathbf{x}, \mathbf{u}) \approx \sum_m \sum_p \ell_{sensor}^{cam}[m, p] \cdot rect_{\Delta_x}(\mathbf{x} - m\Delta_x) rect_{\Delta_x}(\mathbf{u} - p\Delta_u)$$

where m and p are index vectors of dimension 2 that correspond to x and u, respectively, and the discrete image formation process now becomes $$i[m] = \int (\int \ell_{sensor}^{cam}(\mathbf{x}, \mathbf{u}) d\mathbf{u}) \cdot rect_{\Delta_x}(\mathbf{x} \cdot m\Delta_x) d\mathbf{x} = ( \ell_{sensor}^{cam} * g)[m, 0],$$

where $g[m, p] = (s*t)(m\Delta_x, p\Delta_u)$, $$s(x,u) = rect_{\Delta_x}(x) rect_{\Delta_u}(u) \text{ and } t(x,u) = rect_{\Delta_x}(x)$$

It is directly seen that each discrete focal stack image can be computed in the linear closed form, hence the complete process of 3D focal stack formation from the 4D lightfield can be modeled by the linear operation of $\mathbf{\mathcal{f}} = A \cdot \ell + n$, where A is the forward model, n is the detection noise, and $\mathbf{\mathcal{f}}$ is the resulting measured focal stack.

The problem of reconstructing the scene lightfield from the focal stack data can then be posed as the least-square minimization $$\hat{\ell} = \min_{\ell} \|\mathbf{\mathcal{f}} - A \cdot \ell\|_2^2.$$

While reference is made to least-squares minimization, other optimization techniques for solving this problem are also contemplated by this disclosure, such as those that include regularization.

There are two directions that are explored about such a camera system. First, through investigating the forward model A, the system is explicitly quantitatively evaluated with the design parameters such as number of detectors and the placement of them. Second, as the specific reconstruction is an ill-posed problem due to the dimensionality gap between 3D and 4D, a proper choice of regularization is required. With the qualitative study of reconstructed epipolar images on some simple scene, it is shown that a 4 dimensional total variation regularization can reduce the cross-epipolar interference and therefore further decreases the reconstruction error $\|\ell_{recon} - \ell_{true}\|_2^2$ and improves the visual quality of the image rendered from the reconstructed lightfield.

While the spatial relationship between photographs and lightfields can be understood intuitively, analyzing in the Fourier domain presents an even simpler view of the process of photographic imaging—a photograph is simply a 2D slice of the 4D light field. The proposed light-field imaging system is therefore analyzed in the Fourier domain. This is stated formally in the following Fourier slice photography theorem based on Lambertian scene and full aperture assumptions; the measurement at the dth detector is given by $$i_d(x, y) = \frac{\gamma^{d-1}}{\beta^2} \mathcal{F}_{2D}^{-1}\{S_d\{\mathcal{F}_{4D}\{\ell(x, y, u, v)\}\}\}, d = 1, \ldots, D, \quad (1)$$

where $\mathcal{F}_{4D}\{\ell(x,y,u,v)\} = L(f_x, f_y, f_u, f_v)$ and $\mathcal{F}_{2D}\{\ell(x,y)\} = L(f_x, f_y)$ are the 4D and 2D Fourier transforms respectively and the slicing operator $S_d\{\cdot\}$ is defined by $$S_d\{F\}(f_x, f_y) := F(\alpha_d f_x, \alpha_d f_y, (1-\alpha_d) f_x, (1-\alpha_d) f_y) \quad (2)$$

$\{\alpha_d \beta: \alpha_d \in (0,1], d=1, \ldots, D\}$ denotes a set of distances between the lens and the dth detector, $\beta$ is a distance between a lens and the furthest detector to the lens (i.e., the D-th detector with $\alpha_D=1$), $\gamma \in [0,1]$ is a transparency of the light detectors, $f_x, f_y, f_u, f_v \in \mathbb{R}$ are frequencies and D is the number of detectors.

As noted above, the reconstruction problem of $$\hat{\ell} = \min_{\ell} \|\mathbf{\mathcal{f}} - A \cdot \ell\|_2^2$$

is ill-posed and a proper regularization is sought that helps further decrease the reconstruction error recon $\|\ell_{recon} - \ell_{true}\|_2^2$. With the proposed scheme of the lightfield camera, now consider different scenarios of a planar scene object relative to the imaging system. One extreme case is that the object happens to be sharply imaged on one of the focal stack sheet (say the d-th detector). This is regarded as optimal detection, since the light from the object would disperse along the line in the frequency domain with slope $\alpha_d/(1-\alpha_d)$ and be completely sampled by the d-th detector. The lightfield can be reconstructed with high quality using standard least-square minimization methods such as conjugate gradient (CG) descent even without any regularization. More commonly in normal operation, which is regarded as the typical case, the frequency-domain light distribution will fall somewhere between the sampling lines. In this case, minimizing the cost function without regularization would create artifacts on the images rendered from the reconstructed lightfield.

Because of the known "dimensionality gap" of 4D light field reconstruction from focal-stack sensor data, the ordinary least-squares approach will typically have multiple solutions. In such cases, the output of the CG algorithm can depend on the value used to initialize that iteration. To improve the quality of the reconstructed light field and to help ensure a unique solution to the minimization problem, it is often preferable to include a regularization term and use a regularized least-squares minimization approach, also known as a Bayesian method. In regularized least squares, one estimates the light field by $$\hat{\ell} = \operatorname*{argmin}_{\ell} \|f - A \cdot \ell\|_2^2 + R(\ell),$$

where R denotes a regularization function. One simple choice of the regularizer is a 4D total variation (TV) approach that sums the absolute differences between neighboring pixels in the light field, where the "neighbors" can be defined between pixels in the same x-y or u-v planes, and/or in the same epipolar images defined as 2D slices in the x-u or y-v planes.

TV regularization is based on the implicit model that the light-field is piecewise smooth, meaning that its gradient (via finite differences) is approximately sparse. There are other more sophisticated sparsity models that are also suitable for 4D light field reconstruction. For example, one can use known light fields (or patches thereof) as training data to learn the atoms of a dictionary D for a sparse synthesis representation: $\ell$=D z, where z denotes a vector of sparse coefficients. Alternatively, one could use training data to learn a sparsifying transform matrix W such that W $\ell$ denotes a sparse vector of transform coefficients. Both of these sparsifying methods can be implemented in an adaptive formulation where one learns D or W simultaneously with the reconstruction without requiring training data. Other sparsity models such as convolutional dictionaries can be used to define the regularizer R. Typically the effect of such regularizers is to essentially reduce the number of degrees of freedom of the lightfield to enable 4D reconstruction from focal stack data.

The ability to reconstruct images with high fidelity will depend on having sufficient 3D data obtained from the focal stack; hence the image reconstruction quality will improve with a larger number of detector planes. This may be seen from the Fourier slice photography theorem, which suggests that the number of 4D Fourier samples of the light-field image x increases as the number of detectors D increases, yielding improvement of reconstruction quality with D. The optimal positions of the D detector planes is not necessarily with equal spacing along the z axis. In fact, an unequal spacing can be optimal, as seen in the following calculation. A direct consequence of the Fourier slice photography theorem is that the dth focal stack sheet will radially sample the $v_x$–$v_u$ and the $v_y$–$v_v$ Fourier domains along a line with slope $\alpha_d/(1-\alpha_d)$. Now consider a design of a lightfield camera of size β (distance between the last focal stack sheet and the imaging lens) for a working range between $w_1$ and $w_2$ ($w_1$>$w_2$) from the imaging lens. Point sources at $w_{1,2}$ will be sharply imaged at $\alpha_{w_{1,2}}\beta$ which satisfies $$\frac{1}{f} = \frac{1}{w_{1,2}} + \frac{1}{\alpha_{w_{1,2}}\beta}.$$

These confine a sector between $\theta_{w_1}$ and $\theta_{w_2}$ in the $v_x$–$v_u$ and $v_y$–$v_v$ domain, where $$\theta_{w_1} = \tan^{-1}\frac{\alpha_{w_1}}{1-\alpha_{w_1}} \text{ and } \theta_{w_2} = \pi + \tan^{-1}\frac{\alpha_{w_2}}{1-\alpha_{w_2}}.$$

Figure 7:
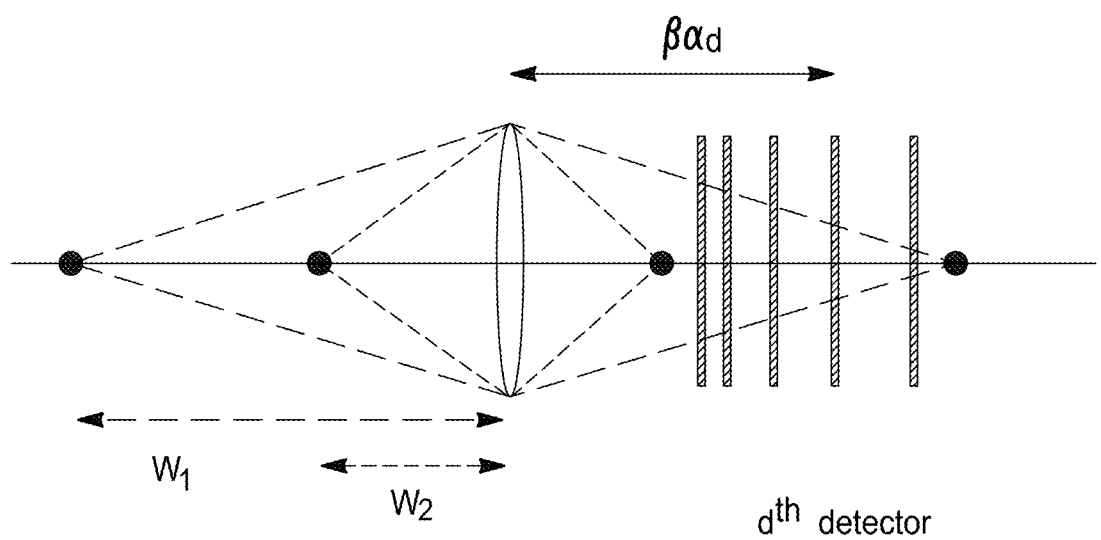
FIG. 7 is a diagram illustrating an optical imaging system with unequal spacing between detector planes.

Without prior information about the scene (and therefore its 4D Fourier spectrum), one can arrange the N focal stack sheet locations such that they correspond to the radial sampling lines that have equal angular spacing by $$\delta\theta = \frac{\theta_{w_2} - \theta_{w_1}}{N}$$

within the sector (confined by the designed working range) as seen in FIG. 7.

Figure 8A:
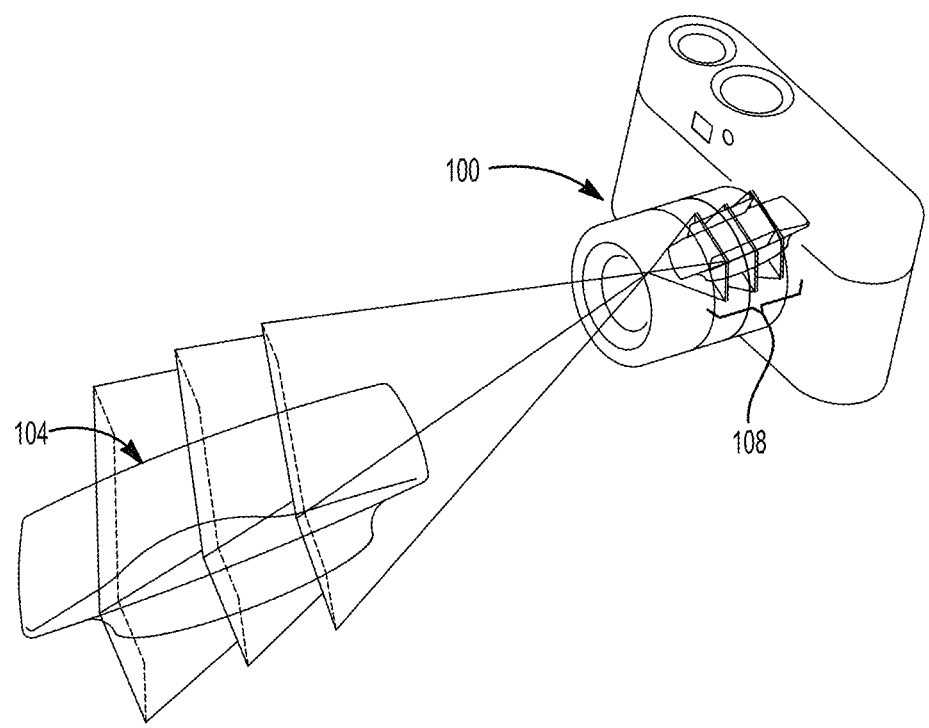
FIGS. 8A and 8B are diagrams of example secure imaging device that captures a focal stack of a scene.
Figure 8B:
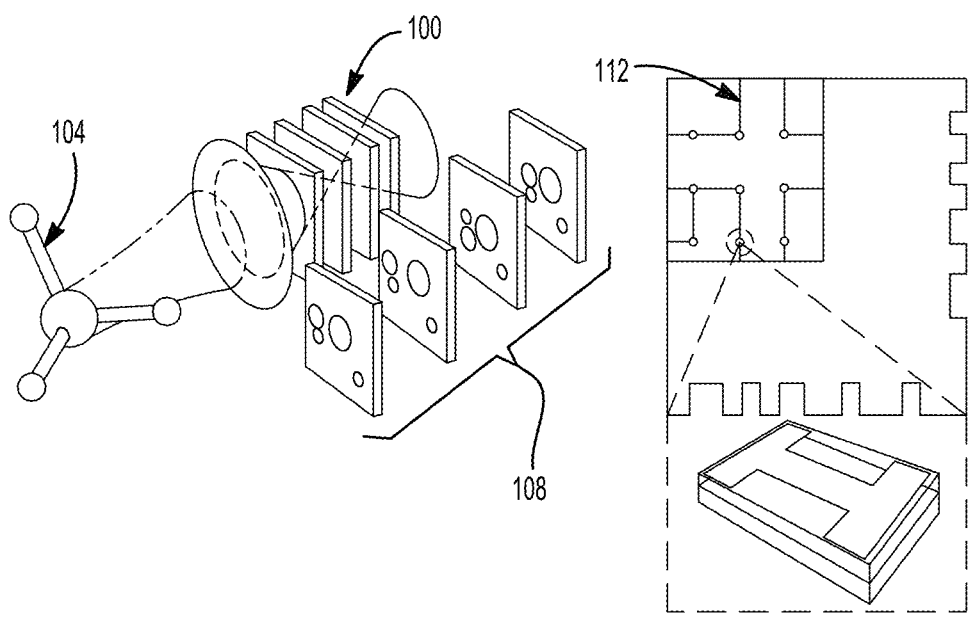

FIGS. 8A and 8B depict an example secure imaging device 100. Most existing image forgery detection methods assume a standard camera and attempt to determine the image authenticity by analyzing features present in the given 2D image. In contrast, the secure imaging device 100 captures multiple images of a scene 104 at a variety of depths, as described above and as depicted in FIGS. 8A and 8B.

Capturing a plurality of images of a scene, in image or video form, provides 3D information about the scene 104 that a single 2D image cannot contain, making forgery detection much easier by adding security features directly on the hardware side. In this example, the secure imaging device 100 includes transparent photodetector arrays 108 placed in front of a CMOS chip as described above. In this way, the imaging device 100 captures a stack of images for a given scene, where each image in the stack of images is captured at a different focal plane. The photodetectors may capture an image in the visible, spectrum, the infrared spectrum or another spectrum.

Since generating realistic blur consistently across the focal stack is challenging, a focal stack is more difficult to fake as compared to a single image. That is, in order for the image to be altered in an undetectable way, the focal stack would have be manipulated in each image at each depth. Such altering and manipulation of the focal stack would be extremely challenging to accomplish in such a way that the consistencies of the content and the defocus blur are maintained across the entire focal stack.

Figure 17:
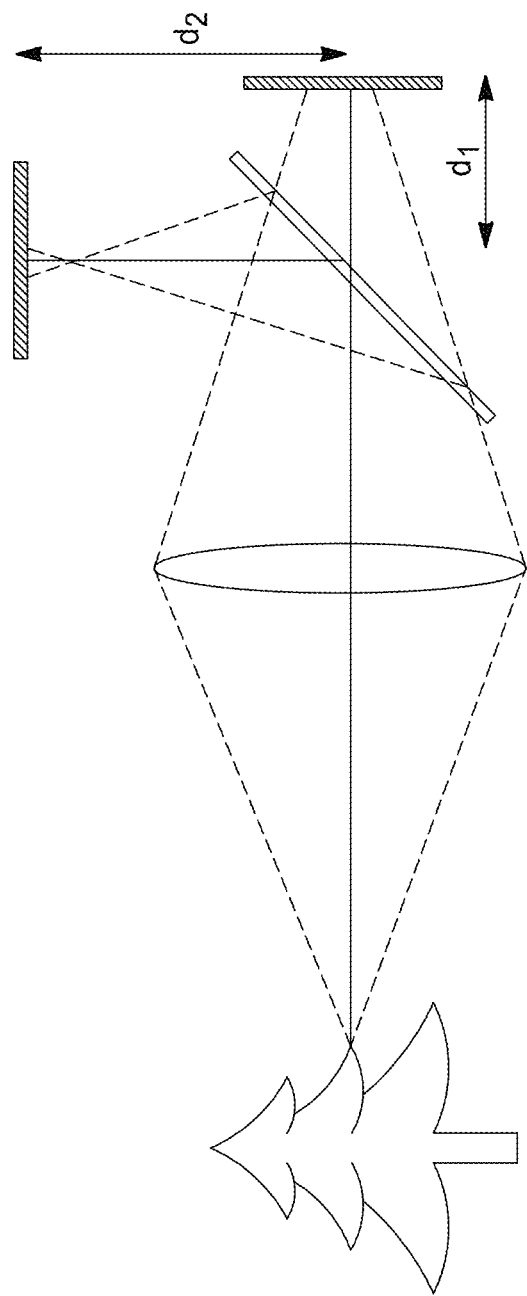
FIG. 17 depicts an alternative arrangement for a secure imaging device.

FIG. 17 depicts an alternative approach for the secure imaging device 100. In this example, the imaging device 100 using a beam splitter to direct light towards two conventional photodetectors (e.g., CMOS chips). The two photodetectors are placed at different distances from the beam splitter, for example one photodetector in front of the nominal focal plane and the other photodetector behind the nominal focal plane. In this way, the focal stack is only comprised of two images. Other optic arrangements for an imaging device configured to capture a focal stack also fall within the scope of this disclosure.

Based on these principles, a manipulation detection system can reliably detect manipulated focal stacks based on the consistency of the images in the focal stack. That is, determining whether images in the stack of images are self-consistent across the stack of images. Compared to existing methods, the manipulation detection system does not alter the original image content (which is the last image in the focal stack—a traditional RGB image), as is done in an active watermarking approach. For example, the multifocal plane blur signature contained within the focal stack is also robust against compression and moderate down sampling. As opposed to conventional photography, the additional scene information and blur signature captured by the secure imaging system imposes inter-focal plane consistency constraints. These consistency constraints enable secure imaging since any image forgery attempt would need to manipulate all the images across the focal stack in a way that satisfies the consistency constraints.

When capturing static objects, the secure imaging device 100 can acquire the focal stack data by taking several traditional images in rapid succession, using the autofocus control of the lens of the camera to shift the focal plane in a controlled way. With recent developments in digital cameras having high-speed autofocus lenses, the secure imaging system 100 can acquire 3-5 images in 0.5 second.

In some embodiments, the secure imaging device 100 further includes a focal stack position control system, which adjusts the positions between the sensor planes. The positions of the sensor planes are set dynamically based on the scene content in a way to maximize the image forgery detection accuracy. In one embodiment, the focal stack imaging module additionally includes an all-in-focus image synthesis unit, which synthesizes an all-in-focus image from the captured focal stack. The all-in-focus image is the image to be viewed (i.e. image of interest) and the associated focal stack serves as the tamper-proof fingerprints for image forgery detection purpose.

Figure 9:
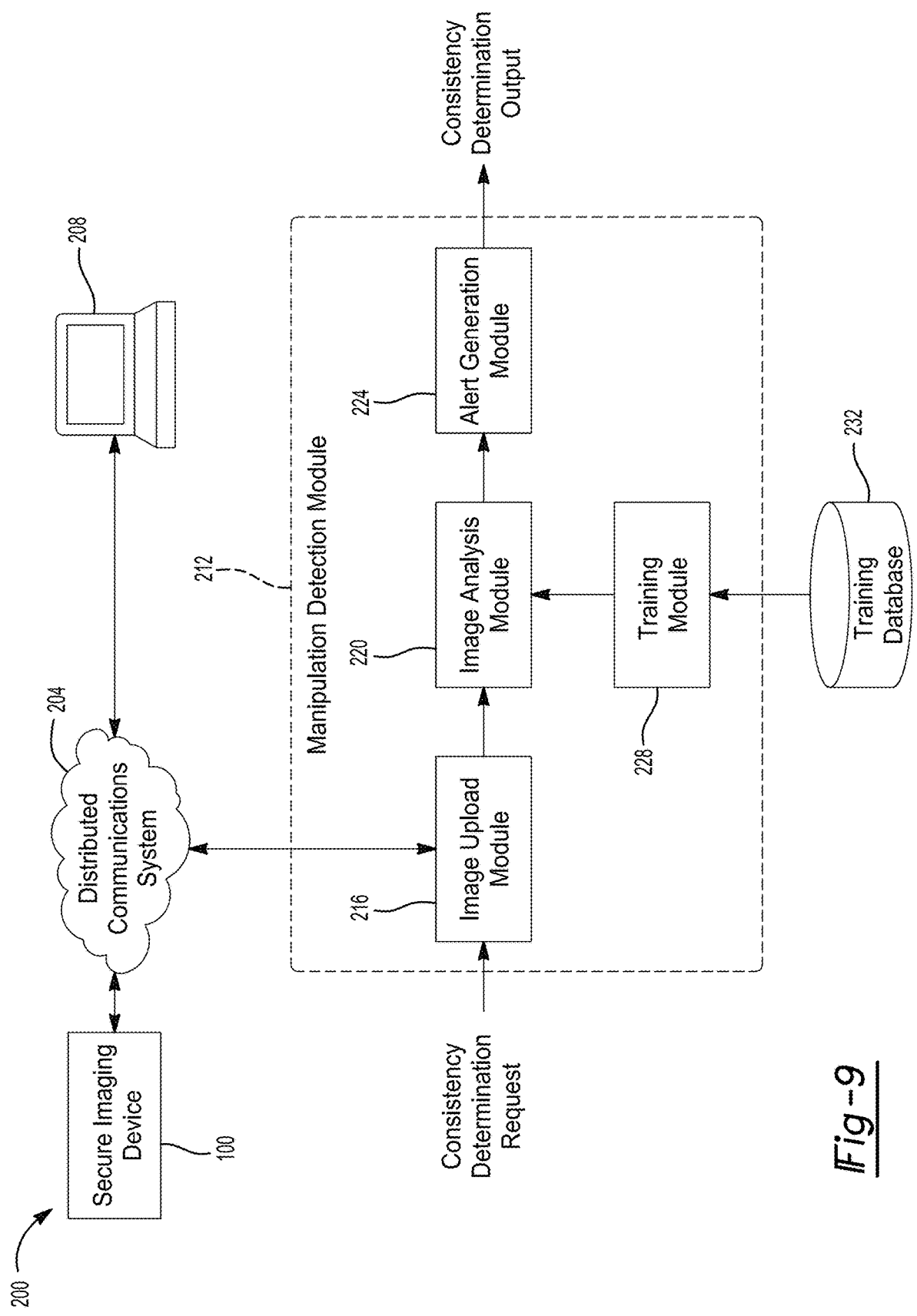
FIG. 9 is a functional block diagram of a manipulation detection system.

FIG. 9 is a functional block diagram of a manipulation detection system 200. The secure imaging device 100 uploads images to a distributed communications system 204, which can be accessed by a plurality of users through their user devices 208. In various embodiments, the secure imaging device 100 can upload the images to a database, which may be local or connected to the secure imaging device 100 via the distributed communications system 204. As described above, the secure imaging device 100 captures focal stack images. A user can download or obtain an image via the distributed communications system 204 and analyze the image to determine if the image is self-consistent, for example according to the blur, color, and/or spectrum information obtained by the secure imaging device 100.

The user submits a consistency determination request to a manipulation detection module 212. The manipulation detection module 212 includes an image upload module 216, an image analysis module 220, a training module 224, and an alert generation module 228. The request identifies the selected image. The user may submit the image with the request; otherwise, the image upload module 216 obtains the image via the distributed communications system 204 using an identifier or URL link contained in the request.

The image analysis module 220 receives the image and analyzes the image to identify any areas of the image that are not consistent, for example in blur, color, and/or spectrum. For instance, one or more attributes of an image are compared across the images in the stack of images. Attributes may include but are not limited to blur, color and spectrum. The image of interest is tagged as authentic in response to an attribute being consistent across the images in the stack of images; whereas, the image of interest is tagged as manipulated in response to an attribute being inconsistent across the images in the stack of images. The image of interest, along with its tag, may also be stored in a non-transitory data store.

In one example, a simple non-machine learning based method is used to detect inconsistencies. More specifically, the summation of RGB pixel values, denoted as E, is computed for each sensor plane. Assuming the extent of the image of the objects are within the sensor region, which is true in many cases, the following conservation rule of E should hold for the above authentic focal stack:

$$|E_i - E_j| < \delta, \text{ for } \forall i,j \in \{1,2,\ldots,n_F\}, i \neq j, \qquad (1)$$

where $E_i$ and $E_j$ indicate the RGB value sum of the i-th focal plane and the j-th focal plane, and $\delta$ is a model hyperparameter. To determine whether a focal stack is manipulated or not, one simply checks whether equation (1) is satisfied. If (1) is violated for some i and j, the algorithm predicts the focal stack to be faked. Otherwise, the focal stack is predicted to be authentic. This detection method is merely illustrative. Other types of non-machine learning detection methods are also contemplated by this disclosure.

In another example, the image analysis module 220 implements a machine learning algorithm to detect whether the images are self-consistent. To create the machine learning algorithm implemented by the image analysis module 220, the training module 228 obtains training data from a training database 232. The training database 232 includes a plurality of focal stack images that are identified as self-consistent and not self-consistent based on blur and/or based on spectrum. In various embodiments, the image analysis module 220 is periodically (e.g., daily) updated with a machine learning algorithm incorporating the most up-to-date training data. Additionally, the training database 232 is updated within additional data from a user device. By analyzing images using a machine learning algorithm, the images can be analyzed in blur and spectrum format (shown in FIGS. 10A-10C and 11A-11B), reducing computational cost of identifying manipulated images.

In some embodiments, the image analysis module 220 implements trained neural networks, such as a convolutional neural network. The trained neural networks consider the specific camera model with which the image is captured, including focal stack data associated with the camera/image detector planes, position data, a number of pixels, a model for how light propagates through the secure imaging system, etc. In an embodiment, the request includes an indicator of a type of secure imaging device 100. In another embodiment, the image analysis module 220 can include a machine learning algorithm to classify the image based on camera models. Then, based on the classification, the image analysis module 220 can determine whether the image is self-consistent or if manipulation is detected.

When classifying the image, a machine learning algorithm may be trained to define a set of groups based on the training dataset included in the training database 232 and classify the image into one of the groups. The image analysis module 220 may use K-means clustering or a classification machine learning algorithm to classify the image into a group of the set of groups. The image analysis module 220 forwards a determination of whether the image is an original or manipulated to the alert generation module 224. The alert generation module 224 transmits and displays the determination on a device from which the consistency determination request was received (e.g., user device 208). In some case, the alert generation module 224 reconstructs the image from the focal stack using the image reconstruction process described above. In some embodiments, the image analysis module 220 can forward a location of the inconsistency to the alert generation module 224, which is also transmitted and displayed to the requesting user.

The image forgery detection methods associated with the secure imaging system 100 and the manipulation detection system 200 can be either based on signal processing techniques or neural networks. The manipulation detection system 200 may implement a content consistency check, i.e., whether the objects present in one image of the focal stack are also present in other images of the focal stack at consistent locations.

The manipulation detection system 200 may also implement a defocus blur consistency check, based on physical-based modeling of the focal stack imaging process. The authenticity of the focal stack can be determined based on whether it satisfies the imaging model. The manipulation detection system 200 may further implement a spectral consistency check, i.e., whether the RGB images present in the focal stack are consistent with the infrared images. The analysis of the manipulation detection system 200 may also include blur signature extraction using high-pass filters, discrete Fourier transform, or some more general feature extraction filters (either designed manually or learned through data of the neural network/machine learning algorithm). The manipulation detection system 200 may also implement PRNU signature analysis of the focal stack. The manipulation detection system 200 can detect self-consistency of an image using a classifier that was trained using the authentic focal stack images and manipulated focal stack images. The manipulation detection system 200 can further indicate a region of the image where the manipulation happened, i.e., where an item was removed from the image.

For illustrative purposes, FIGS. 10A-10C depict example original, manipulated, and ground plane images. FIGS. 10A-10C in detail the above disclosure of secure imaging exploiting the content, the defocus blur, and the spectral consistency in the focal stack images. Regarding content consistency, the focal stack images of two bolts 304 and 308 were captured experimentally by moving a CMOS sensor along the optical axis, as shown in FIG. 10A. Then, the front bolt 304 of FIG. 10A was removed using Photoshop, the resulting manipulated focal stack images are shown in FIG. 10B. As a reference, the ground truth focal stack images were also captured with only a back bolt 308 present, as shown in FIG. 10C. Given the manipulated focal stack in FIG. 10B, a human can determine whether it is authentic or manipulated by checking the inter-focal plane content consistency 312, e.g., the part of the bolt highlighted by the blue dashed rectangle in sensor plane 1 is darkish, while in sensor plane 2 and 3 it is brighter. This violates the inter-focal plane consistency and provides evidence for detecting forgery. Similarly, the text region 316 in sensor plane 3, highlighted by green dashed rectangle, shows incomplete text and whitish glow around text boundary. This is also inconsistent with the corresponding regions in sensor plane 1 and 2, where text is complete, and no whitish glow can be found.

FIGS. 10A-10C show that, if a manipulator removed an object in the background or foreground, then the blur of the area where the object was removed would be inconsistent with the remainder of the portions of the image that were not manipulated. Similarly, the infrared would be inconsistent. For example, as humans emit heat, the removal of a human would result in traces of heat surrounding the area of removal, which the manipulation detection system can identify as inconsistent using a machine learning algorithm.

Figures 11A, 11B:
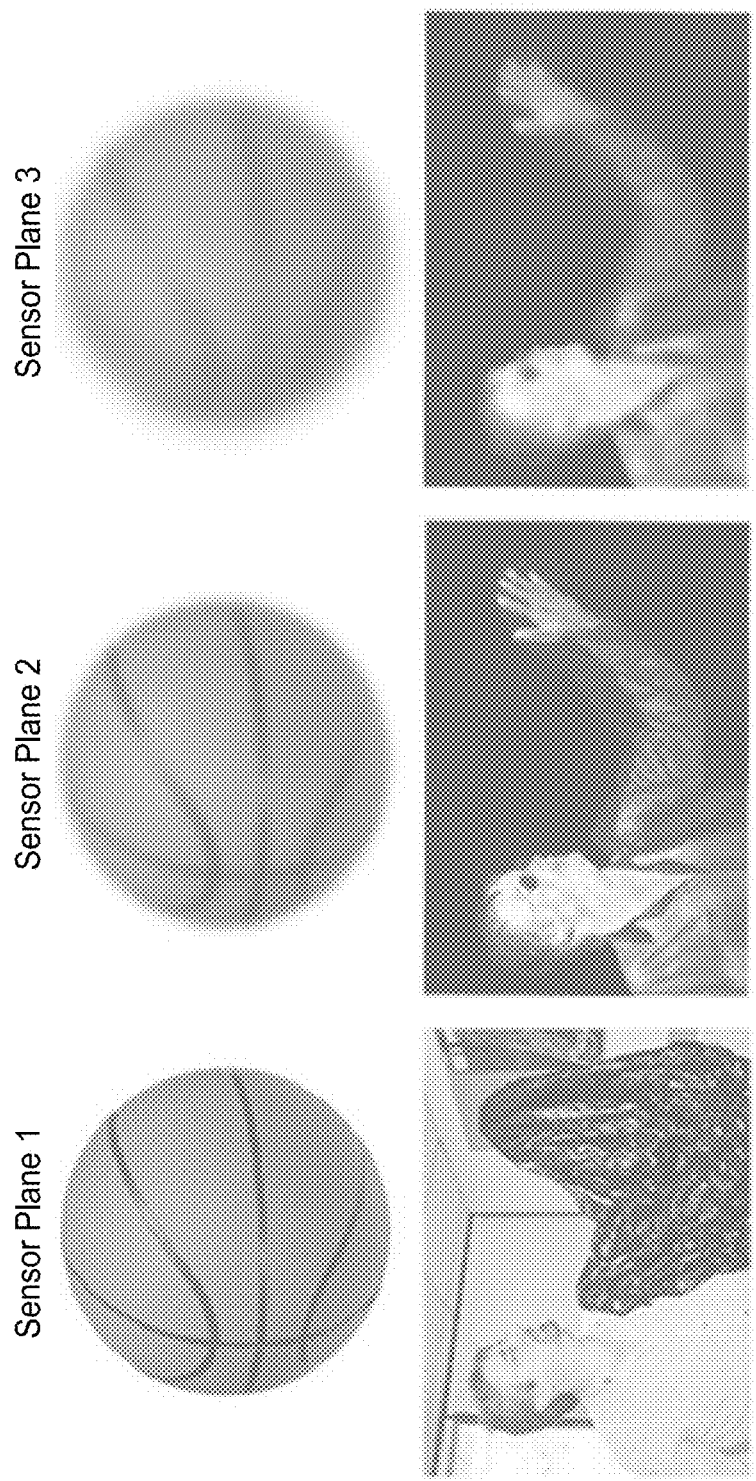
FIGS. 11A-11B depict an example of defocus blur consistency for the manipulation detection system to detect manipulation.

FIGS. 11A-11B depict an example of defocus blur consistency for the manipulation detection system to detect manipulation. FIG. 11A shows a focal stack of a basketball. Images at all three sensor planes shows the same object, hence satisfying the content consistency. However, we can further validate its authenticity by checking whether the defocus blur present in each image is consistent with each other, e.g., given the fact that the basketball in the first sensor plane is in focus, it should be blurred in the sensor plane 2 and 3, and the blur should be larger in sensor plane 3. The exact amount of expected blur can be deduced from the sensor positioning and the aperture size, which can be identified through a machine learning algorithm. Any region with the blur deviate from the expected blur amount indicates a potential forgery.

FIG. 11B considers spectral consistency. A conventional RGB image is captured using sensor plane 1 (CMOS sensor). Transparent infrared detectors are used in sensor plane 2 and 3 to capture infrared images (possibly defocused, as in sensor plane 3). This spectrally hybrid focal stack enforces spectral consistency across the focal stack, e.g., given an RGB human face, whether the infrared images of the face show consistent features. Any manipulation of such hybrid focal stack would require significant knowledge in the infrared characteristics of the objects being imaged.

Finally, note that although the described figures include some visually apparent clues in the focal stack, there are in addition many less obvious features (but equally important) that can be checked using the inter-focal plane consistency, e.g., camera breathing effect. These unapparent features, though hard to notice, can still be picked up by a neural network and enables accurate forgery detection.

To demonstrate the effectiveness of using focal stacks as a secure image format, we generated datasets containing manipulated focal stacks and trained a detection CNN to localize the forgery regions. The localization performance is then compared with single image based methods to show the advantage of focal stack over conventional images for image security applications.

First, a set of authentic focal stacks were generated from the Lytro flower light field dataset using the add-shift algorithm. The Lytro flower light field dataset contains 3343 light fields of flower scenes captured by Lytro Ilium light field camera. Each light field has a size of 376×541×14×14, but only the central 8×8 sub-aperture images were used for focal stack generation. Each generated focal stack contains nF=7 images with differing focus positions. The focus positions are chosen to have their corresponding disparities evenly distributed in range [−1, 0.3], which covers roughly the entire possible object depth range.

Next, inpainted focal stack datasets were generated using three CNN based methods: GMCNN, EdgeConnect and Gated Convolution. GMCNN uses a multi-column network to extract features at different scale level. A special ID-MRF loss is designed to promote the diversity and realism of the inpainted region. EdgeConnect is a two-stage inpainting process. In the first stage, an edge generator generates edges for the inpainting region. In the second stage, an inpainting network fills the missing region with the help of the completed edges from the first stage. Gated Convolution uses a learnable feature gating mechanism to solve the issue that a normal convolution treats both all pixels equally and inpaints the image following a two-stage coarse to fine process. Inpainted focal stacks were generated using multiple methods to test the generalization ability of the network, i.e., by training the detection network using focal stacks inpainted by one method and then evaluating its performance on focal stacks inpainted by another method. This investigation mimics the more realistic scenario where the method used to inpaint the focal stack is unknown at the time of detection.

More specifically, random stroke-type regions were inpainted for each focal stack. All images in the same focal stack shared the same spatial inpainting region. The goal of inpainting is typically trying to hide something in the original image and hence identical inpainting region across images in the same focal stack should be a reasonable assumption. Each image is then inpainted independently using one of the above CNN methods. The CNN inpainting models were pre-trained on the places2 dataset using their original implementation and fined tuned on the flower focal stack dataset.

In an example embodiment, the detection network is based on DeepLabv3 technique as described by L. C. Chen et al in "Rethinking atrous convolution for semantic image segmentation" arXiv preprint arXiv:1706.05587, 2017 which is incorporated herein in its entirety. DeepLabv3 was originally proposed for semantic segmentation but is re-purposed for region localization due to the similarity in these two tasks. The Atrous Spatial Pyramid Pooling (ASPP) layer in DeepLabv3 ensures large receptive field and fine detailed network output at the same time, which is beneficial for inpainting region localization. In this embodiment, ResNet-18 as described by k. He in "Deep residual learning for image recognition" in Proceedings of the IEEE Conference on Computer Vision and Pattern Recognition is used as the backbone for feature extraction. A normal input image to the DeepLabv3 is a 3D tensor of shape (C,H,W), whereas focal stack is a 4D tensor of shape (nF,C,H,W), so the focal stack is reshaped to be (nFxC,H,W) by concatenating images along the color channel. The network outputs a pixel-wise probability map that indicates whether a pixel is inpainted and we train the network using binary cross-entropy loss.

The detection network was trained with JPEG augmentation. Specifically, the training input focal stacks have a 50% probability of being JPEG compressed, with a JPEG quality factor of 70.

For experiments, the inpainted focal stack dataset generated from Lytro flower light fields contains 3343 focal stacks for each inpainting method (GMCNN, EdgeConnect, Gated Convolution). Each focal stack contains nF=7 images with changing focus depth and is associated with a ground truth inpainting region for training and evaluation. 2843 focal stacks were used for fine-tuning the inpainting networks and also for training the detection network. The remaining 500 focal stacks are used for evaluating the inpainting localization performance.

For training set-up, the detection network was trained using Adam optimizer with batch size 3 as described by D. P. Kingman et al in "Adam: A method for stochastic optimization" in International Conference on Learning Representations, May 2015. The models were trained for 110 epochs, with an initial learning rate $10^{-4}$ that was reduced to $10^{-5}$ after 70 epochs. Data augmentation was used in the form of horizontal flipping with 50% probability, in addition to the JPEG compression augmentation described above.

To evaluate the detection network, the true positive (TP), false positive (FP) and false negative (FN) predictions at the pixel level were counted for each test sample, with the classification probability threshold set to 0.5. Then the F1 scores, defined as $$\frac{TP}{TP+\frac{1}{2}(FP+FN)},$$

were computed and averaged over all test samples to evaluate the network's inpainting localization performance.

Additionally, the detection network was tested for robustness against common post-processing methods including JPEG compression, gaussian noise, and resizing. Specifically, additive white gaussian noise with a in range [0, 1.6] was used to test the robustness against noise. Test focal stacks were down sampled using nearest neighbor interpolation with ratio in range [1, 2] to test the robustness against resizing. Also, JPEG compressed test focal stacks with JPEG quality in range [30, 100] to test the robustness against compression. Note that these postprocessing processes are only applied to the test focal stacks; the models were trained using augmentation based only on horizontal flipping and JPEG compression with quality 70.

To study the dependence of the localization performance on the focal stack size nF, the models were trained using inpainted focal stack datasets with nF=1, 2, 3, 5, 7. Specifically, the nF=7 dataset is the dataset described above. The nF=1 dataset was obtained by only using the 7th (last) image of each focal stack in nF=7 dataset. Similarly, the nF=2 dataset contains the 1st and 7th images, the nF=3 dataset contains the 1st, 4th, 7th images, and the nF=5 dataset contains the 1st, 3rd, 4th, 5th and 7th images.

FIGS. 12A-12I show the localization results trained on the GMCNN inpainted focal stack dataset and evaluated on testing focal stacks inpainted by GMCNN, EdgeConnect and Gated Convolution. The advantage of using focal stack (nF>2) over single image (nF=1) for inpainting region localization is apparent and significant for every test configuration. With reference to FIGS. 12A-12C, training and testing both on the GMCNN dataset using nF=1 has a F1 score about 0.67 and using nF=2 has a F1 score about 0.87. The difference is even more dramatic when training is performed on the GMCNN dataset and testing is performed on the Gated Convolution dataset (top-right subplot): nF=1 has a F1 score about 0.11 and using nF=2 has a F1 score about 0.80. Increasing nF further improves the F1 score, though not significantly. Although the single image (nF=1) localization method performs fairly well when the testing data are generated by the same inpainting method as the training data, it performs poorly when the testing data are inpainted by a different method. On the other hand, there is only a very small performance drop for the focal stack based method when testing on focal stacks inpainted by a method different from training. These results show that the focal stack based method has a much better generalization ability across different inpainting methods. This benefit can be understood as follows: for single image based inpainting region localization, the detection network relies heavily on detecting inpainting method specific artifacts, such as checkerboard patterns produced by transpose convolutions or unnatural transitions between inpainted and not inpainted regions, to determine whether a region is inpainted. However, these criteria cannot be universal for detecting inpainting because a different method will likely have a different checkerboard pattern or a different transition artifact between inpainted and not inpainted regions. On the other hand, the focal stack based method has a much more inpainting-method agnostic clue to determine whether a region is inpainted or not: it can check whether the content and the defocus blur across a focal stack in a region is physically and semantically consistent. Such consistency checks do not depend on the methods used for inpainting and hence it should better generalize across different inpainting methods.

Figure 13:
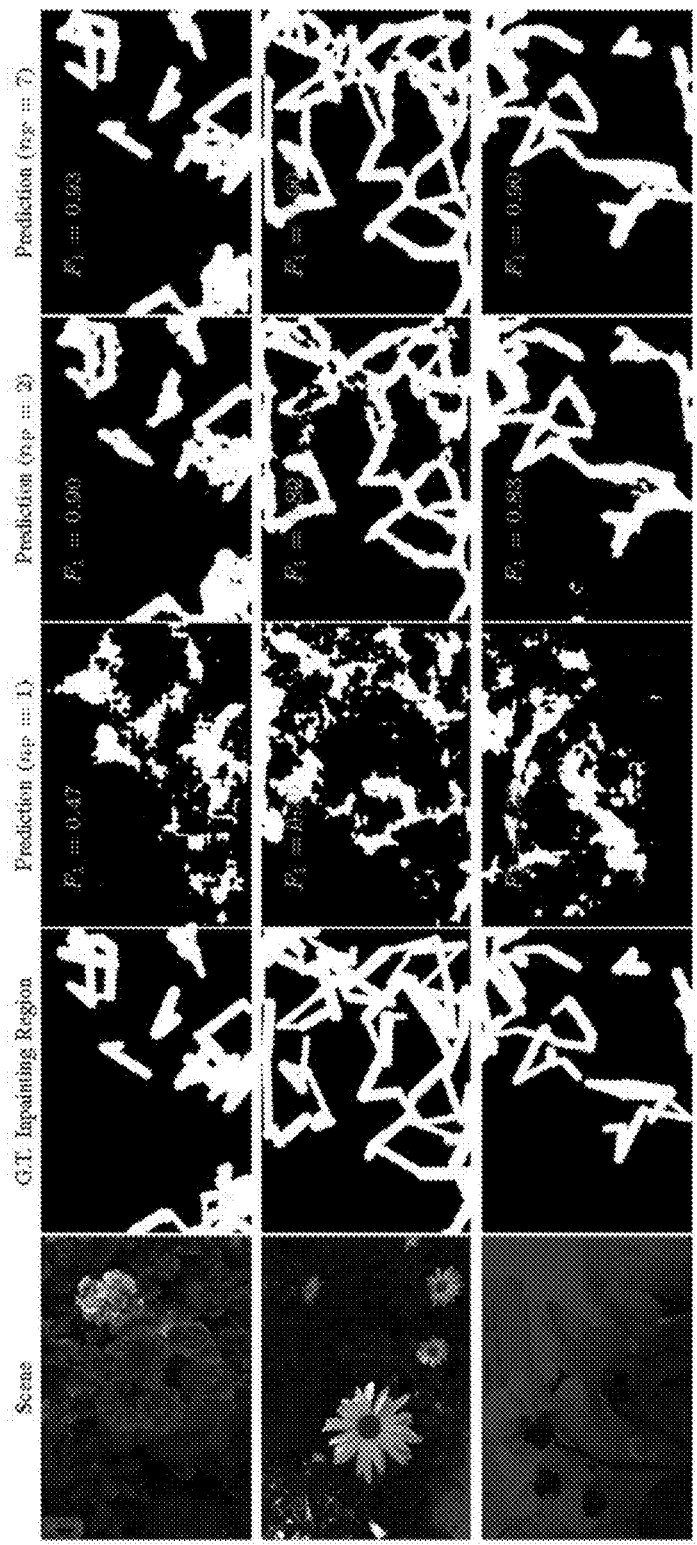
FIG. 13 illustrate example localization results of the model trained on GMCNN dataset and tested on the Gated Convolution dataset.

FIG. 13 shows example predicted inpainting regions, using a model trained on GMCNN inpainted focal stacks and tested on Gated Convolution inpainted focal stacks. The single image based inpainting localization performs poorly, whereas using a focal stack of only nF=2 greatly improves the prediction and nF=7 model has the best performance.

Figure 14A:
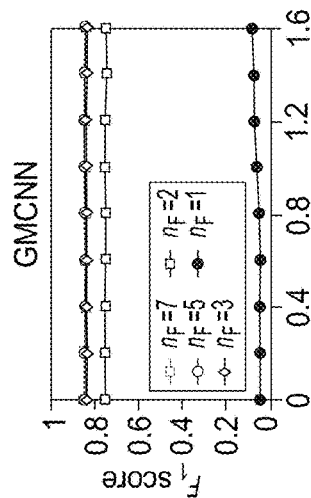
FIGS. 14A-14I show localization F1 scores for focal stack data with networks trained on Edgeconnect dataset with JPEG augmentation and tested on GMCNN data (FIGS. 14A, 14D, 14G), EdgeConnect data (FIGS. 14B, 14E, 14H) and Gated Convolution data (FIGS. 14C, 14F, 14I). The robustness against Gaussian noise, resizing and JPEG compression are shown for each model.
Figure 14B:
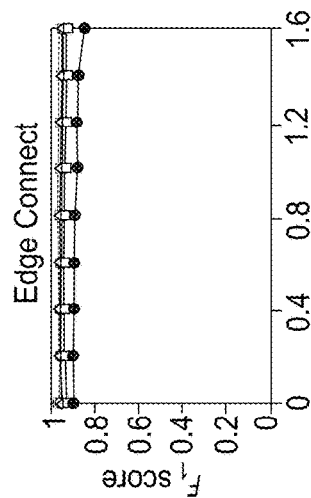
Figure 14C:
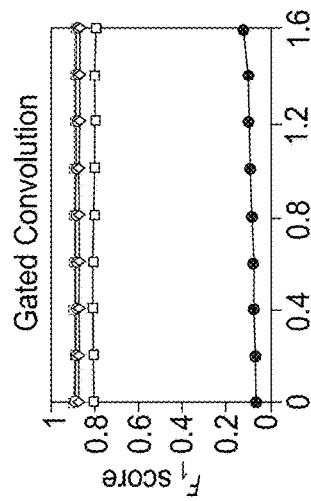
Figure 14D:
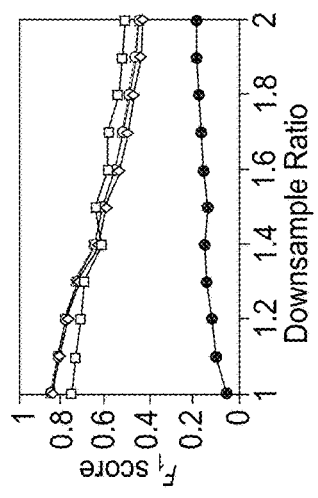
Figure 14E:
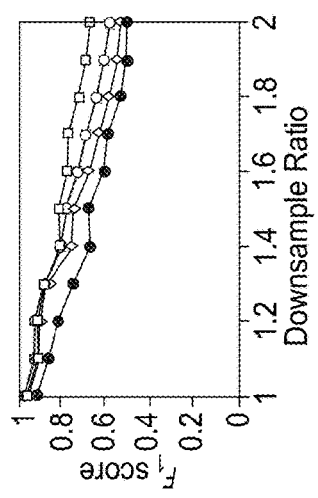
Figure 14F:
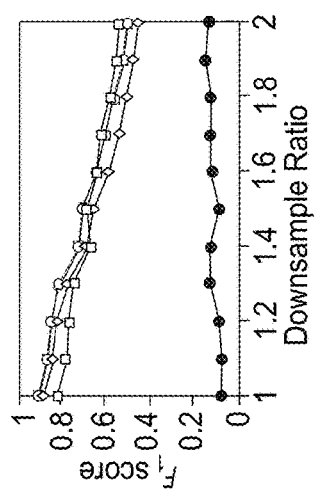
Figure 14G:
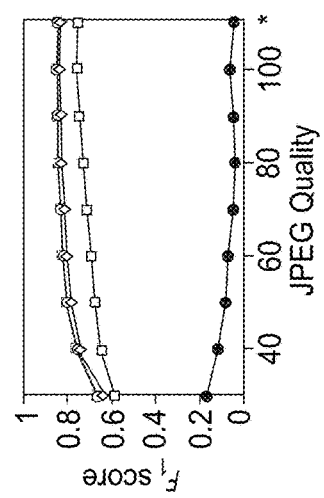
Figure 14H:
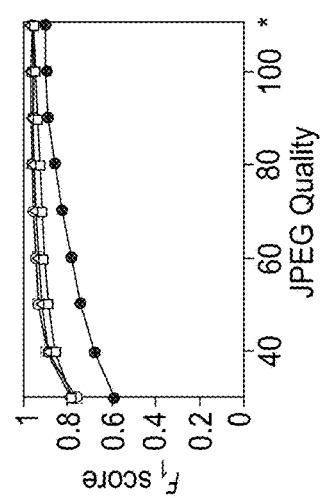
Figure 14I:
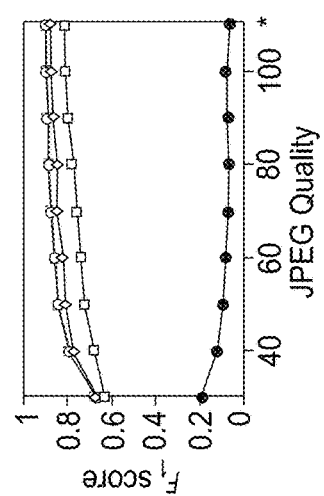
Figure 15A:
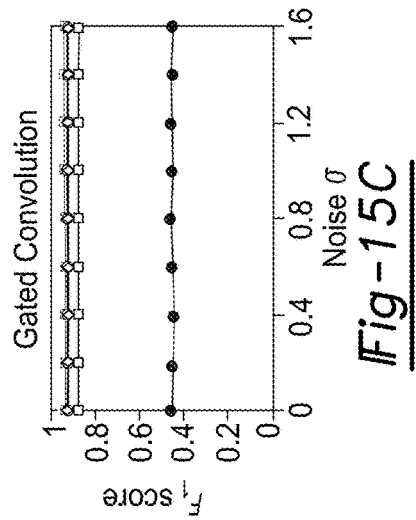
FIGS. 15A-15I show localization F1 scores for focal stack data with networks trained on Gated Convolution dataset with JPEG augmentation and tested on GMCNN data (FIGS. 15A, 15D, 15G), EdgeConnect data (FIGS. 15B, 15E, 15H) and Gated Convolution data (FIGS. 15C, 15F, 15I). The robustness against Gaussian noise, resizing and JPEG compression are shown for each model.
Figure 15B:
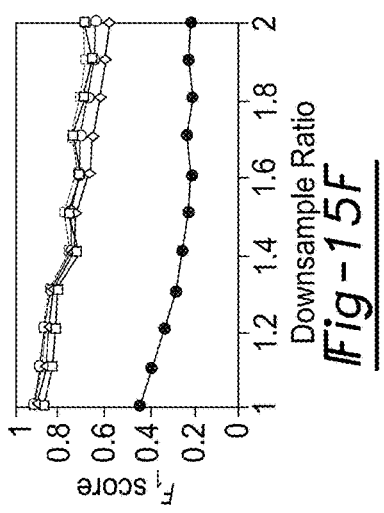
Figure 15C:
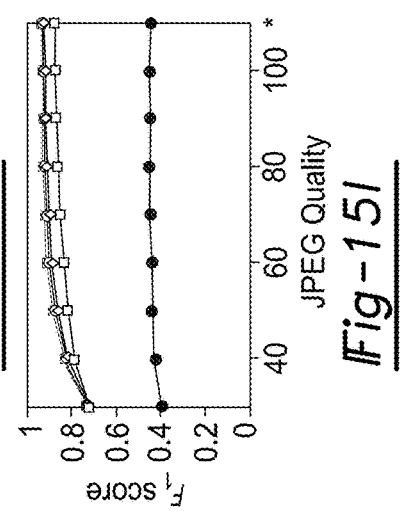
Figure 15D:
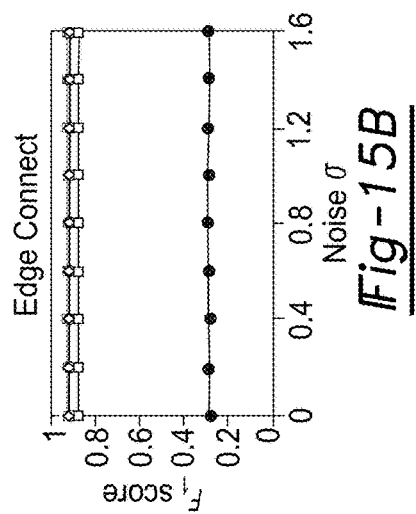
Figure 15E:
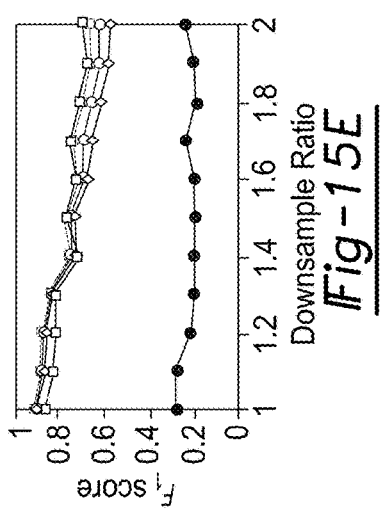
Figure 15F:
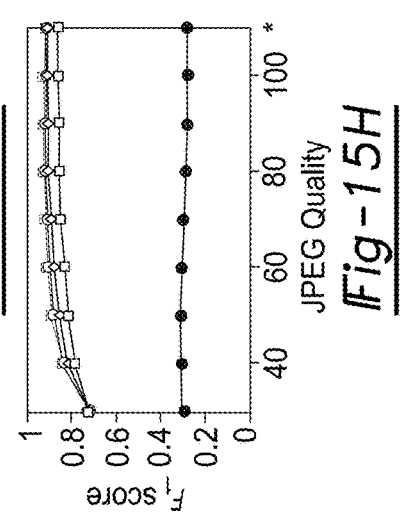
Figure 15G:
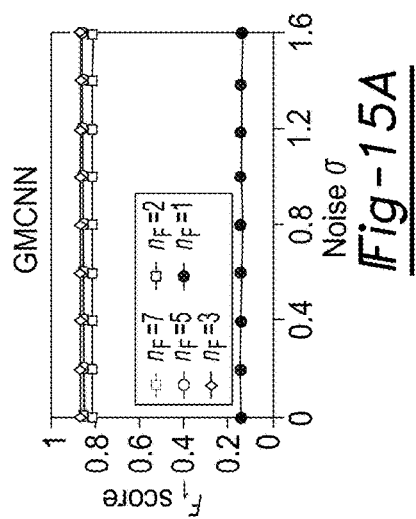
Figure 15H:
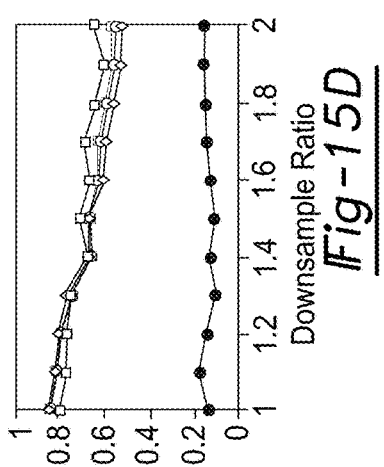
Figure 15I:
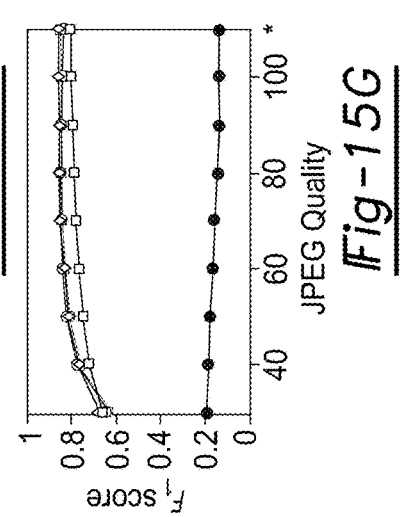

Detection models were also trained using EdgeConnect inpainted focal stacks, and using Gated Convolution inpainted focal stacks, to verify that the trends above are not specific to the particular training dataset. FIGS. 14A-14I and FIGS. 15A-15I show the results. The general findings are similar as those from FIG. 12A-12I, with some minor differences: the advantage of a focal stack over a single image for the model trained and tested on EdgeConnect inpainted dataset is smaller, as shown in FIGS. 14B, 14E and 14H. This is likely because the EdgeConnect inpainted images contain more visually apparent inpainting artifacts. Indeed, when EdgeConnect inpainted regions are inspected closely, they tend to be darker, compared to non-inpainted regions. This makes inpainting localization using single image easier so the additional images in the focal stack do not help much. However, when the model is evaluated on the dataset inpainted by a method different from the training data, the single image localization performance degrades severely, while the focal stack based models retain high performance in these cases. This is again because the focal stack based method uses the more generalizable inter-focal stack consistency check to localize the inpainting region. For models trained on Gated Convolution, the single image based method performs poorly (FIGS. 15C, 15F, 15I), even when tested on focal stacks inpainted by the same method. This is because the Gated Convolution inpainted images contain fewer artifacts and are more visually realistic. This makes the single image based method struggle to find discriminating forgery traces.

All results presented above demonstrate good robustness against several post-processing methods, including Gaussian noise (1st row), image resizing (2nd row) and JPEG compression (3rd row), showing that the proposed detection method would be useful in practical cases, such as in determining whether an internet image file is authentic or not, where these post-processing operations are common.

To verify that the advantage of a focal stack over a single image is not simply due to the increase in the number of total pixels, additional models were trained for nF=2, using focal stacks downsampled by factors of √2 and 2. FIGS. 16A-16I shows the results. The nF=2, downsampling ratio=√2 system has the same total number of pixels as nF=1 system without downsampling, and nF=2, downsampling ratio=2 model has two times fewer total pixels, compared to the system of nF=1, without downsampling. FIGS. 16A-16I also show that reducing the total pixel numbers in the focal stack system only slightly reduces the localization performance; the main performance gain of using a focal stack for inpainting localization is due to the multiple sensor plane nature of the focal stack system that encodes robust inter-focal stack consistency clues for forgery detection.

Figure 18:
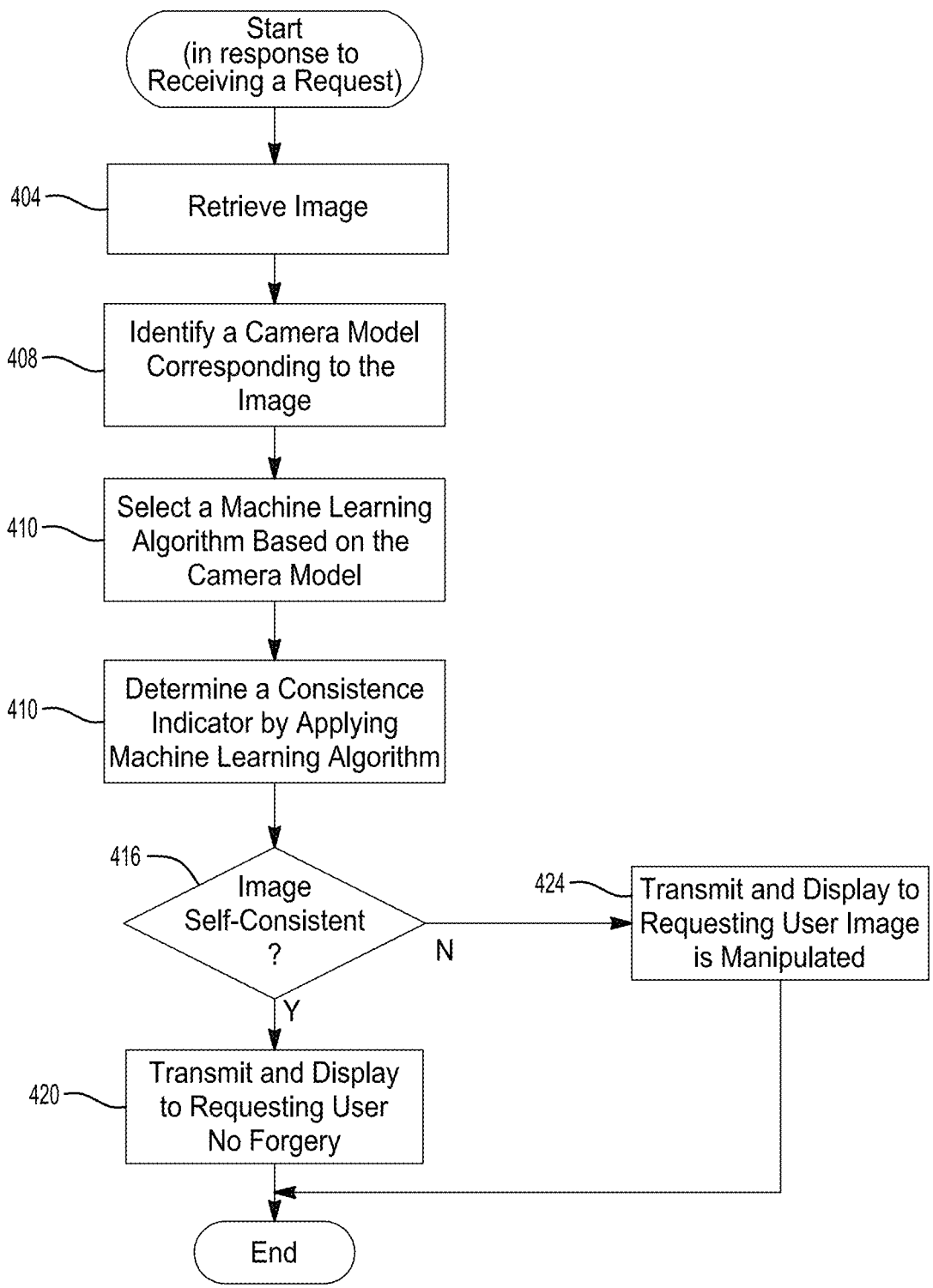
FIG. 18 is a flowchart depicting a manipulation detection system determining whether an image has been manipulated.

FIG. 18 is a flowchart depicting a manipulation detection system determining whether an image has been manipulated. Control begins in response to receiving a request from a user. The request includes identifying information an image to be analyzed. At 404, control retrieves the image (or, if the image is included in the request, this step is skipped). At 408, control identifies a camera model corresponding to the image. The camera model may be included in the request. Otherwise, control can classify the image to identify the camera model by implementing a machine learning algorithm.

Control proceeds to 410 to select a machine learning algorithm based on the camera model. Then, at 412, control determines a consistence indicator by applying the selected machine learning algorithm. Based on the consistence indicator, control determines at 416 whether the image is self-consistent. The consistence indicator may be binary or a range of values. In an embodiment, the image is determined as self-consistence if the consistence indicator does not exceed a threshold value. If control determines the image is self-consistent, control continues to 420 to transmit and display to the requesting user that no forgery or manipulation is indicated. Then, control ends. Otherwise, if the image is not self-consistent, control continues to 424 to transmit and display to the requesting user that the image has been manipulated. Then, control ends.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An image manipulation detection method, comprising:
   receiving, by an image processor, a stack of images for a given scene, where each image in the stack of images is captured concurrently at a different focal plane by an imaging device and one of the images in the stack of images is designated as an image of interest;
   determining, by the image processor, whether images in the stack of images are self-consistent across the stack of images;
   tagging, by the image processor, the image of interest as authentic in response to the images being self-consistent across the stack of images;
   tagging, by the image processor, the image of interest as manipulated in response to the images not being self-consistent across the stack of images; and
   storing, by the image processor, the image of interest along with its tag in a data store.

2. The image manipulation detection method of claim 1 further comprises determining whether defocus blur in the images is consistent across the stack of images.

3. The image manipulation detection method of claim 1 further comprises determining whether images in the stack of images are self-consistent using machine learning.

4. The image manipulation detection method of claim 1 further comprises determining whether images in the stack of images are self-consistent using a neural network.

5. The image manipulation detection method of claim 1 further comprises comparing a given image to the other images in the stack of images on a pixel by pixel basis.

6. The image manipulation detection method of claim 5 wherein tagging the image of interest as manipulated further comprises identifying locations on the image of interest that have been manipulated.

7. An image manipulation detection method, comprising:
   receiving, by an image processor, a stack of images for a given scene, where each image in the stack of images is captured at a different focal plane by an imaging device and one of the images in the stack of images is designated as an image of interest;
   determining, by the image processor, whether images in the stack of images are self-consistent across the stack of images;
   tagging, by the image processor, the image of interest as authentic in response to the images being self-consistent across the stack of images;
   tagging, by the image processor, the image of interest as manipulated in response to the images not being self-consistent across the stack of images; and
   storing, by the image processor, the image of interest along with its tag in a data store;
     wherein the imaging device includes a stack of two or more photodetectors with each of the two of more photodetectors arranged in a different geometric plane and the geometric planes are substantially parallel to each other.

* * * * *